United States Patent [19]

Hayakawa et al.

[11] Patent Number: 5,725,685
[45] Date of Patent: Mar. 10, 1998

[54] SOFT MAGNETIC ALLOY THIN FILM WITH NITROGEN-BASED AMORPHOUS PHASE

[75] Inventors: Yasuo Hayakawa; Akihiro Makino, both of Nagaoka, Japan

[73] Assignee: Alps Electric Co., Ltd., Tokyo, Japan

[21] Appl. No.: 739,352

[22] Filed: Oct. 29, 1996

Related U.S. Application Data

[63] Continuation of Ser. No. 412,497, Mar. 28, 1995, Pat. No. 5,656,101.

[30] Foreign Application Priority Data

Mar. 28, 1994 [JP] Japan .................................. 6-57890
[51] Int. Cl.$^6$ .................................................. H01F 1/147
[52] U.S. Cl. ........................... 148/306; 148/305; 420/128
[58] Field of Search ................................. 148/304, 403, 148/305, 306; 420/128

[56] References Cited

U.S. PATENT DOCUMENTS 5,117,321  5/1992  Nakanishi et al. ..................... 360/120
5,262,248 11/1993  Ihara et al. ........................... 428/610

FOREIGN PATENT DOCUMENTS 0342921 11/1989  European Pat. Off. ............... 148/306

*Primary Examiner*—John Sheehan
*Attorney, Agent, or Firm*—Guy W. Shoup

[57] ABSTRACT

A soft magnetic alloy thin film includes a fine crystalline phase and an amorphous phase. The fine crystalline phase includes an average crystalline grain size of 10 nm or less in diameter and has body-centered cubic structure mainly composed of Fe. The amorphous phase has a nitrogen (N) compound as the main composition and occupies at least 50% of the structure of the thin film. An element M is incorporated at least in the amorphous phase, and includes at least one element selected from the group consisting of Ti, Zr, Hf, V, Nb, Ta, W, and rare earth metal elements. A plane-type magnetic device is made using this thin film.

3 Claims, 29 Drawing Sheets

$Fe_{82.6}Hf_{7.7}N_{9.7}$ ANNEALED AT 550°C FOR 6 HOURS

Fe72.2Hf13.2N14.6  ⊢6nm⊣

ANNEALED AT 400°C IN
MAGNETIC FIELD OF 2KOe

SOFT MAGNETIC ALLOY THIN FILM WITH NITROGEN-BASED AMORPHOUS PHASE

This application is a continuation of application Ser. No. 08/412,497, filed Mar. 28, 1995, now U.S. Pat. No. 5,656,101.

BACKGROUND OF THE INVENTION

1. Field of the Invention

The present invention relates to soft magnetic alloy thin films for use in, for example, thin-film inductors and transformers, and also to magnetic devices incorporating the thin films.

2. Description of the Related Art

Soft magnetic alloys are used to produce, for example, magnetic head cores, thin-film inductors, transformers and choke coils. For these devices to operate adequately, the soft magnetic alloys must exhibit magnetic properties such as high saturation magnetic flux density, high magnetic permeability, low coercive force and the ability to be formed into a thin film.

Various alloy compositions have been studied to identify alloys which can be used to produce suitable soft magnetic alloys. Conventionally, crystalline alloys such as Sendust (Fe-Al-Si alloy), permalloy (Fe-Ni alloy), and silicon steel (Fe-Si alloy) have been employed as soft magnetic alloys. More recently, Fe-based and Co-based amorphous alloys have also been used.

Although the conventional alloys are adequate for some applications, the recent trend toward smaller components and higher operating frequencies necessitates the development of new materials having even better soft magnetic properties for use as thin-film inductors, transformers, and choke coils.

Although Sendust has adequate soft magnetic properties for some applications, it is limited in that its saturation magnetic flux density is about 1.1 tesla (T). Permalloy also can exhibit adequate soft magnetic properties, but is limited in that its saturation magnetic flux density is as low as 0.8 T. Silicon steel has high saturation magnetic flux density, but exhibit poor soft magnetic properties.

Another crystalline soft magnetic alloy thin film is disclosed in U.S. Pat. No. 5,117,321. This crystalline soft magnetic alloy comprises an Fe-B-N system, where B represents at least one element selected from the group consisting of Zr, Hf, Ti, Nb, Ta, V, Mo, and W, and its compositional ranges in atomic percent are 0<B<20 and 0<N<22, wherein when B≦7.5, then N>5, and when N≦5, then B>7.5.

The soft magnetic alloy thin film disclosed in U.S. Pat. No. 5,117,321 is obtained by applying heat treatment after film formation to change the amorphous phase to a crystalline phase. The resulting crystalline soft magnetic alloy thin film has a high magnetic permeability at low frequencies (below 20 MHz), a high saturation magnetic flux density, and low coercive force. The composition can be adjusted to eliminate magnetostriction. However, the imaginary component of the magnetic permeability of this thin film becomes larger than the real component at frequencies higher than about 20 MHz, as discussed below and shown in FIG. 16 of this application. When the imaginary component exceeds the real component, the total magnetic permeability is substantially reduced. Therefore, the crystalline alloy disclosed in U.S. Pat. No. 5,117,321 is inadequate for applications above 20 MHz.

On the other hand, Co-based amorphous alloys have adequate soft magnetic properties, but exhibit poor saturation magnetic flux density (1.0 T). Although Fe-based amorphous alloys have a saturation magnetic flux density of 1.5 T or more, they also exhibit poor soft magnetic properties. In addition, Co-based and Fe-based amorphous alloys do not have sufficient thermal-stability.

As described above, it has been difficult for conventional materials to have both high saturation magnetic flux density and adequate soft magnetic properties for use in high frequency (i.e., above 20 MHz) applications.

SUMMARY OF THE INVENTION

Accordingly, it is an object of the present invention to provide a soft magnetic alloy thin film having a high saturation magnetic flux density, a low coercive force, and a high magnetic permeability, even at high frequencies (i.e., above 20 MHz).

The foregoing object is achieved according to the present invention through the provision of a soft magnetic alloy thin film including a fine crystalline phase with an average crystalline grain size of 10 nm or less in diameter and having a body-centered cubic structure comprising iron (Fe) as a main component; an amorphous phase comprising a nitrogen (N) compound as the main component; and an element M included at least in the amorphous phase, the element M including at least one element selected from the group consisting of Ti, Zr, Hf, V, Nb, Ta, W and rare earth metal elements, wherein the amorphous phase occupies at least 50% of the thin film structure.

The above-described soft magnetic alloy thin film according to the present invention has a compositional formula of $Fe_aM_bN_c$, where the compositional ratios a, b, and c represent atomic percent in the ranges of:

$60 \leq a \leq 80$, $7 \leq b \leq 26$, and $5 \leq c \leq 30$.

In accordance with one embodiment of the present invention, the compositional ratio c is preferably in the range of $10 \leq c \leq 22$ atomic percent, and even more preferably in the range of $10 \leq c \leq 18$.

In accordance with another embodiment of the present invention, the compositional ratio b is preferably in the range of $10 \leq b \leq 15$ atomic percent.

BRIEF DESCRIPTION OF THE DRAWINGS

FIG. 29 (b) is a sectional view taken on line A—A of FIG. 29 (a).

DETAILED DESCRIPTION OF THE INVENTION

Figure 1:
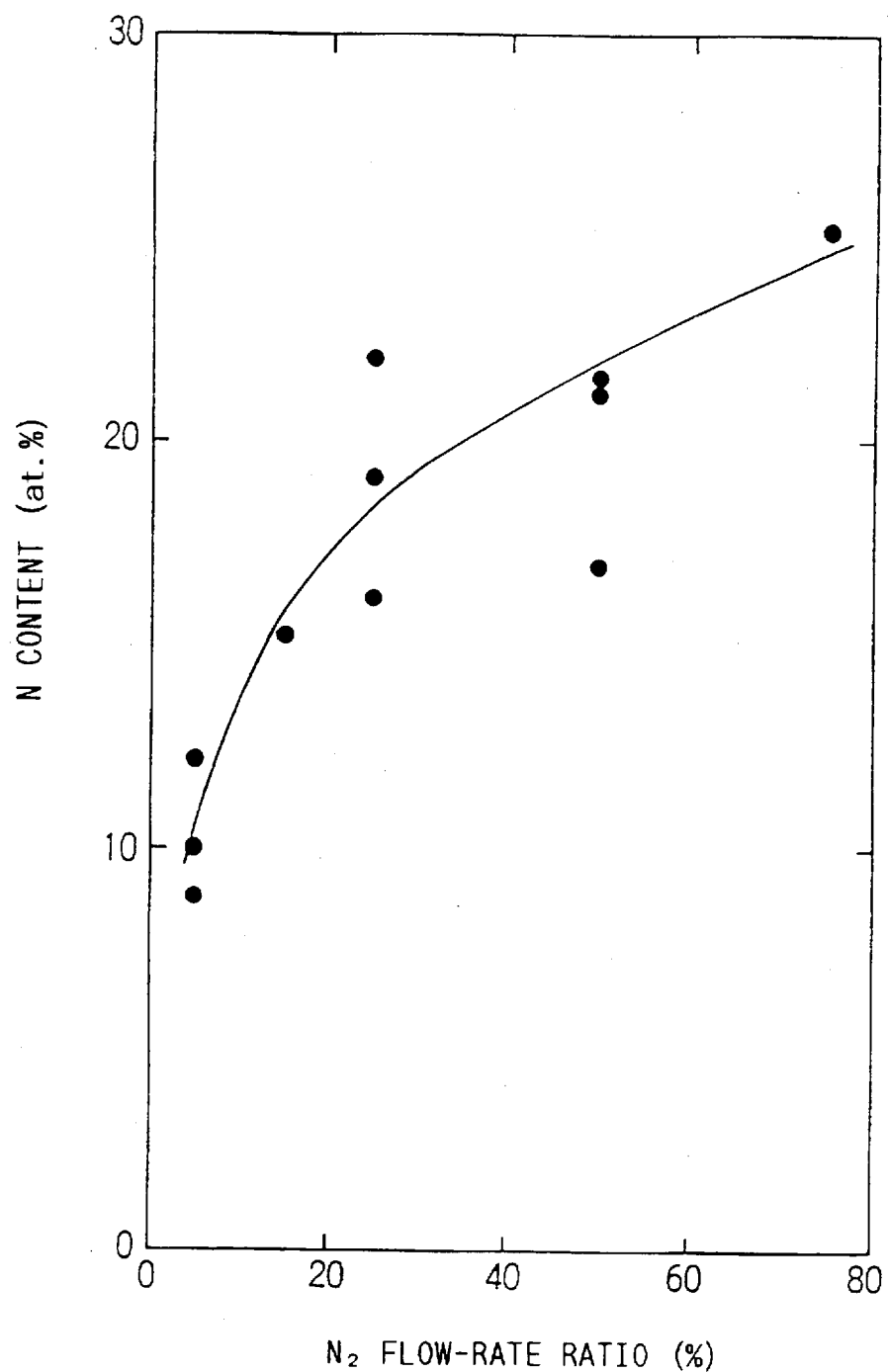
FIG. 1 shows the relationship between the flow ratio of $N_2$ gas and Ar gas in a film forming apparatus and the nitrogen content of a resulting soft magnetic alloy thin film.

A Soft magnetic alloy thin film according to the present invention includes a soft magnetic alloy thin film including a fine crystalline phase with an average crystalline grain size of 10 nm or less in diameter and having a body-centered cubic structure comprising iron (Fe) as a main component; an amorphous phase comprising a nitrogen (N) compound as the main component; and an element M included at least in the amorphous phase, the element M including at least one element selected from the group consisting of Ti, Zr, Hf, V, Nb, Ta, W and rare earth metal elements, wherein the amorphous phase occupies at least 50% of the thin film structure. The rare earth metal elements include elements selected from the group consisting of La, Ce, Pr, Nd, Pm, Sm, Eu, Gd, Tb, Dy, Ho, Er, Tm, Yb, and Lu.

Preferably, the soft magnetic alloy thin film has a composition formula of $Fe_aM_bN_c$, where the compositional ratios a, b, and c, represent atomic percentages in the ranges:

$60 \leq a \leq 80$, $7 \leq b \leq 26$, and $5 \leq c \leq 30$.

The Fe content in the above-described composition formula should be equal to or greater than 60 atomic percent because, if the Fe content is less than 60 atomic percent, the saturation magnetic flux density of the resulting thin film becomes unacceptably small. Additionally, the content of element M should be equal to or greater than 7 atomic percent because, if the M content is less than 7 atomic percent, the resulting thin film does not include an amorphous structure. Further, the N content should be greater than or equal to 5 atomic percent because, if the N content is less than 5 atomic percent, the resistivity and magnetic permeability of the resulting thin film become unacceptably small.

To obtain high saturation magnetic flux density, the N content is preferably 10 to 22 atomic percent, and even more preferably 10 to 18 atomic percent. It is preferable the content of element M is 10 atomic percent or more to ensure the formation of an amorphous alloy structure. To obtain superior soft magnetic properties, it is preferable that the upper limit of the content of element M is 26 atomic percent, and more preferably 15 atomic percent.

It is preferable for the above-described soft magnetic alloy thin film to include a structure which is at least 50% made up of an amorphous phase, with fine grains of a body-centered cubic Fe-based crystalline structure, having an average crystalline size of 10 nm in diameter, dispersed in the amorphous phase along with nitrogen compounds including element M or Fe. As fine crystalline grains of Fe are formed in the amorphous phase, saturation magnetic flux density of the thin film increases. Because the structure is 50% or more made up of the amorphous phase, the resistivity of the soft magnetic alloy increased, thereby minimizing a loss of permeability at high-frequencies.

To manufacture a soft magnetic alloy thin film according to the present invention, for example, a thin film including an amorphous phase having the above-described compositional formula as its main component is formed on a substrate using a vapor-phase deposition method, such as high-frequency sputtering, wherein nitrogen gas is introduced. The nitrogen content of the resulting soft magnetic alloy thin film can be adjusted by regulating the amount of nitrogen gas flowing in a film forming chamber during vapor deposition. When the amount of nitrogen gas supplied to the film forming chamber is increased, the nitrogen content of the deposited soft magnetic alloy thin film is also increased.

Fine crystalline grains may be formed in a soft magnetic alloy thin film, which is substantially made up of the amorphous phase, by annealing. When fine crystalline grains are formed by annealing, it is preferable that the ratio of the crystalline phase to amorphous phase be less than 50%. If this ratio exceeds 50%, magnetic permeability of the resulting thin film at high-frequencies is decreased. The crystalline grains dispersed in the amorphous structure are preferably 30 nm or less in diameter, with the average diameter being 10 nm or less. These fine crystalline grains increase the saturation magnetic flux density of the thin film. The amorphous phase increases resistivity and prevents magnetic permeability from decreasing at high-frequencies.

A soft magnetic alloy thin film according to the present invention may be manufactured in the following manner.

Alloy targets having an average composition of $Fe_{87}Hf_{13}$ were prepared and subjected to high-frequency sputtering at 200 W of power in an argon carrier gas atmosphere containing 5% to 80% of nitrogen at a gas pressure of 0.6 Pa to produce soft magnetic alloy thin films of various compositions. The composition ratio of Fe and Hf was adjusted by increasing or decreasing the amount of Hf chips in the alloy targets. The resultant thin films were annealed at 400° C. for three hours in a magnetic field of 2 kOe. Tables 1 and 2 show magnetic characteristics of the resultant thin films, including saturation magnetic flux density Bs (T); coercive force Hc (Oe); saturation magnetic field when a magnetic field is applied in the direction of the axis of difficult magnetization (hard axis) of the thin-film samples, namely the anisotropic magnetic field Hk (Os); magnetic permeability μ (at 10 KHz); magnetostriction λs ($\times 10^{-6}$); and resistivity ρ (μΩcm). The saturation magnetic flux density and the coercive force were measured using an A.C. BH tracer. Crystallized glass substrates having a film thickness of 1 to 2 μm were employed as the substrates.

TABLE 1

| SAMPLE No. | | | Bs (T) | Hc (Oe) | Hk (Oe) |
|---|---|---|---|---|---|
| 1 | $Fe_{77.6}Hf_{13.6}N_{8.8}$ | AS DEPOSITED | 0.62 | 1.68 | 3.52 |
| | | HEAT-TREATED | 1.13 | 0.31 | 2.29 |
| 2 | $Fe_{71.5}Hf_{12.4}N_{16.1}$ | AS DEPOSITED | 0.98 | — | — |
| | | HEAT-TREATED | 1.19 | — | 4.24 |
| 3 | $Fe_{66.7}Hf_{11.8}N_{21.5}$ | AS DEPOSITED | 0.65 | — | 0.8 |
| | | HEAT-TREATED | 0.78 | 0.73 | 1.46 |
| 4 | $Fe_{74.3}Hf_{13.6}N_{12.1}$ | AS DEPOSITED | 1.49 | 0.3 | 1.64 |
| | | HEAT-TREATED | 1.5 | 0.4 | 2.64 |
| 5 | $Fe_{72.4}Hf_{12.3}N_{15.2}$ | AS DEPOSITED | 1.38 | 0.43 | 2.04 |
| | | HEAT-TREATED | 1.37 | 0.35 | 4.94 |
| 6 | $Fe_{69.1}Hf_{11.8}N_{19.1}$ | AS DEPOSITED | 1.17 | 0.68 | 4.98 |
| | | HEAT-TREATED | 1.16 | 0.78 | 6.70 |
| 7 | $Fe_{75.3}Hf_{14.7}N_{10}$ | AS DEPOSITED | 0.38 | — | — |
| | | HEAT-TREATED | 0.88 | 0.32 | 1.34 |
| 8 | $Fe_{64.8}Hf_{13.2}N_{22}$ | AS DEPOSITED | 0.56 | 0.63 | 1.94 |
| | | HEAT-TREATED | 0.68 | 0.37 | 2.32 |
| 9 | $Fe_{69.2}Hf_{13.9}N_{16.9}$ | AS DEPOSITED | 0.90 | 0.21 | 0.66 |
| | | HEAT-TREATED | 1.1 | 0.55 | 5.58 |
| 10 | $Fe_{67}Hf_{14}N_{19}$ | AS DEPOSITED | 1.18 | 0.70 | 3.44 |
| | | HEAT-TREATED | 1.17 | 0.66 | 5.68 |
| 11 | $Fe_{64.8}Hf_{14.1}N_{21.1}$ | AS DEPOSITED | 0.52 | 0.31 | 0.58 |
| | | HEAT-TREATED | 0.65 | 0.38 | 1.8 |
| 12 | $Fe_{61.5}Hf_{13.4}N_{25.1}$ | AS DEPOSITED | — | — | — |
| | | HEAT-TREATED | — | — | — |

TABLE 2

| SAMPLE No. | | μ (10 MHz) | λs ($\times 10^{-6}$) | ρ (μΩcm) |
|---|---|---|---|---|
| 1 | AS DEPOSITED | 38 | 0.93 | 193.6 |
| | HEAT-TREATED | 2518 | 2.25 | 150.8 |
| 2 | AS DEPOSITED | 252 | 6.97 | 278.6 |
| | HEAT-TREATED | 1174 | 8.62 | 251.9 |
| 3 | AS DEPOSITED | 253 | 4.06 | 312.7 |
| | HEAT-TREATED | 1274 | 5.55 | 343.7 |
| 4 | AS DEPOSITED | 1192 | 3.76 | 140.9 |
| | HEAT-TREATED | 4128 | 3.57 | 132.5 |
| 5 | AS DEPOSITED | 750 | 6.86 | 192.8 |
| | HEAT-TREATED | 2114 | 7.00 | 186.5 |
| 6 | AS DEPOSITED | 734 | 10.02 | 293.3 |
| | HEAT-TREATED | 1152 | 9.47 | 267.9 |
| 7 | AS DEPOSITED | 6.70 | −0.06 | 235.0 |
| | HEAT-TREATED | 948 | 1.36 | 184.4 |
| 8 | AS DEPOSITED | 352 | 7.83 | 263.3 |
| | HEAT-TREATED | 1608 | 4.23 | 376.2 |
| 9 | AS DEPOSITED | 128 | 2.44 | 453.6 |
| | HEAT-TREATED | 1522 | 7.77 | 291.4 |
| 10 | AS DEPOSITED | 343 | 8.83 | 292.0 |
| | HEAT-TREATED | 1139 | 9.72 | 286.3 |
| 11 | AS DEPOSITED | 146 | 3.33 | 359.5 |
| | HEAT-TREATED | 2067 | 3.81 | 385.8 |
| 12 | AS DEPOSITED | — | — | 422.4 |
| | HEAT-TREATED | — | — | 376.9 |

All the samples indicated in Tables 1 and 2 exhibited superior saturation magnetic flux density, coercive force, magnetic permeability, magnetostriction and resistivity. When the anisotropic magnetic field Hk of a sample is weak, the magnetic permeability of the sample was large at low frequencies and drastically decreased at high frequencies. On the other hand, when the anisotropic magnetic field of a sample was strong, the magnetic permeability of the sample was relatively lower at low frequencies, but did not decrease significantly at high frequencies. This implies that the magnetic permeability of the thin film is superior at high frequencies. Table 3 shows measured data of samples which employed elements other than Hf as the element M. It is understood from Table 3 that the samples had good magnetic properties.

TABLE 3

| No. | | Bs (T) | Hc (Oe) | μ (10 MHz) | $\mu s$ ($\times 10^6$) | ρ (μΩcm) |
|---|---|---|---|---|---|---|
| 13 | $Fe_{71}Ti_{14}N_{15}$ | 1.2 | 2.03 | 435 | 3.8 | 250 |
| 14 | $Fe_{68}Zr_{12}N_{20}$ | 1.0 | 0.85 | 2512 | 3.0 | 320 |
| 15 | $Fe_{75}V_7N_{18}$ | 1.1 | 3.05 | 538 | 2.8 | 150 |
| 16 | $Fe_{65}Nb_{18}N_{17}$ | 1.0 | 1.12 | 1895 | 4.0 | 280 |
| 17 | $Fe_{69}Ta_{10}N_{21}$ | 1.2 | 0.68 | 2020 | 3.2 | 353 |
| 18 | $Fe_{67}W_{10}N_{23}$ | 0.9 | 3.55 | 587 | 2.5 | 380 |
| 19 | $Fe_{64}Y_{26}N_{10}$ | 1.0 | 0.9 | 1200 | 1.2 | 420 |
| 20 | $Fe_{72}La_{15}N_{13}$ | 1.1 | 0.8 | 1582 | 3.2 | 183 |
| 21 | $Fe_{71}Ce_{14}N_{15}$ | 1.0 | 1.3 | 1070 | 2.0 | 325 |
| 22 | $Fe_{70}Nd_{20}N_{10}$ | 1.2 | 1.0 | 953 | 3.0 | 128 |
| 23 | $Fe_{68}Gd_{12}N_{20}$ | 1.0 | 1.5 | 878 | 1.4 | 238 |
| 24 | $Fe_{68}Tb_9N_{23}$ | 0.9 | 3.8 | 378 | 12.1 | 208 |
| 25 | $Fe_{70}Dy_{12}N_{18}$ | 1.0 | 5.0 | 280 | 8.7 | 185 |
| 26 | $Fe_{73}Ho_{12}N_{15}$ | 1.1 | 2.0 | 483 | 4.2 | 382 |
| 27 | $Fe_{75}Er_{12}N_{13}$ | 1.2 | 3.3 | 380 | 2.8 | 383 |

FIG. 1 shows the relationship between the nitrogen content of a resulting thin film and an $N_2$/Ar flow rate ratio based on the amount of nitrogen gas contained in argon gas flowing in the film forming chamber during formation of the thin film.

As shown in FIG. 1, it is clear that increasing the amount of the nitrogen gas contained in the argon gas increases the nitrogen content in the resulting thin film. It is also obvious that the nitrogen content of the resulting thin film can be adjusted by altering the amount of the nitrogen gas contained in the argon gas.

Figure 2:
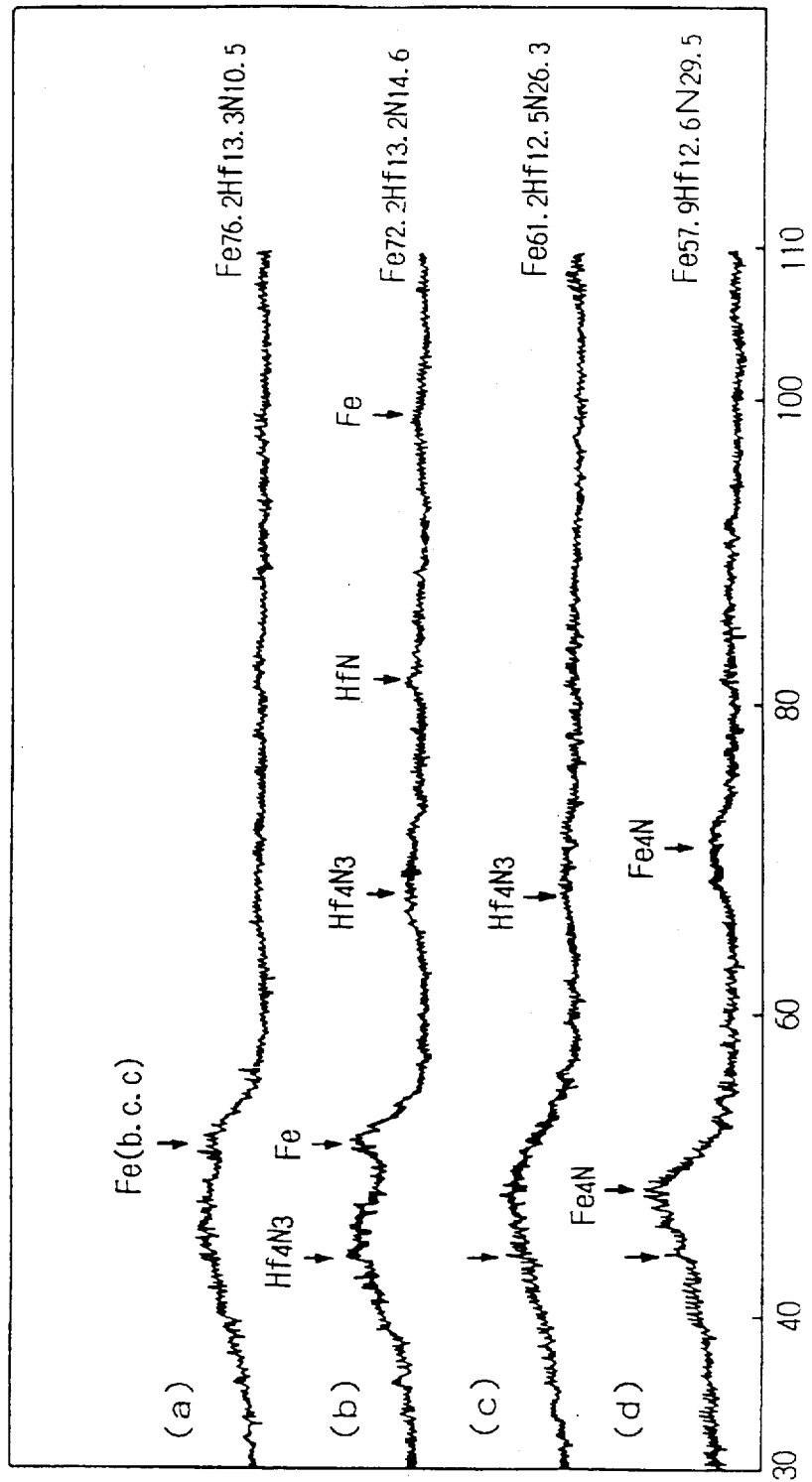
FIG. 2 is a chart illustrating the X-ray diffraction patterns of not-heat-treated (as deposited) samples having compositional formulas of $Fe_{76.2}Hf_{13.3}N_{10.5}$, $Fe_{72.2}Hf_{13.2}N_{14.6}$, $Fe_{61.2}Hf_{12.5}N_{26.3}$, and $Fe_{57.9}Hf_{12.6}N_{29.5}$.

FIG. 2 shows X-ray diffraction patterns of not-heat-treated (i.e., as formed in the film forming chamber) samples having compositional formulas of $Fe_{76.2}Hf_{13.3}N_{10.5}$, $Fe_{72.2}Hf_{13.2}N_{14.6}$, $Fe_{61.2}Hf_{12.5}N_{26.3}$, and $Fe_{57.9}Hf_{12.6}N_{29.5}$.

As shown in FIG. 2, these samples had broad peaks at diffraction angles ranging from 40 to 60 degrees, which is unique to an amorphous phase. Since the peaks corresponding to the compounds of $Hf_4N_3$, $Fe_4N$, $Hf_4N_3$, and HfN were recognized in the figure, it was found that the structure mainly comprised an amorphous phase made up of nitrogen compounds including Fe and Hf.

Figure 3:
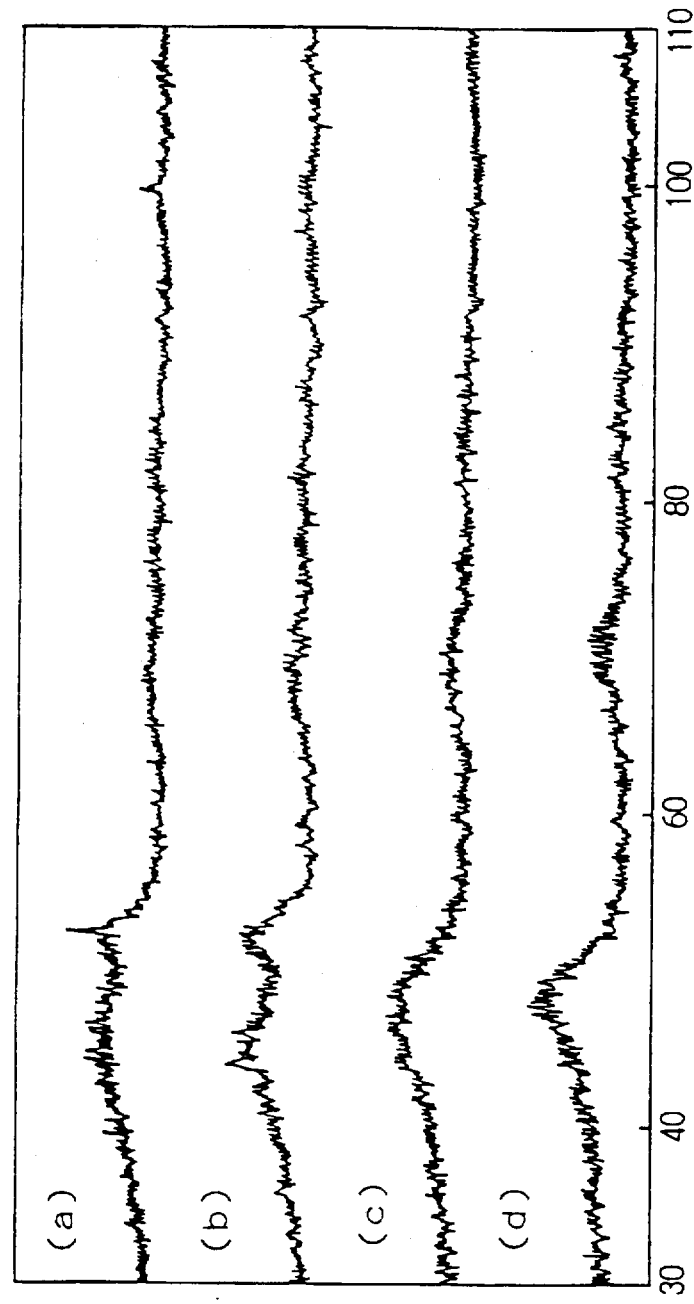
FIG. 3 is a chart illustrating the X-ray diffraction patterns of samples having the same compositional formulas as the samples of FIG. 2, and which has been annealed at 400° C. in a magnetic field of 2 kOe.

FIG. 3 illustrates X-ray diffraction patterns of the samples shown in FIG. 2 after the samples were annealed at 400° C. in a magnetic field of 2 kOe. In FIG. 3, the annealing in the magnetic field is represented by letters, UFA, which stands for "uniaxial field annealing."

From FIG. 3, it is clear that the heat treatment did not significantly affect the X-ray diffraction patterns of the samples. As understood from FIGS. 2 and 3, the thin film structure of the indicated samples exhibited a larger proportion of amorphous phase to crystalline phase as the nitrogen content.

Figure 4:
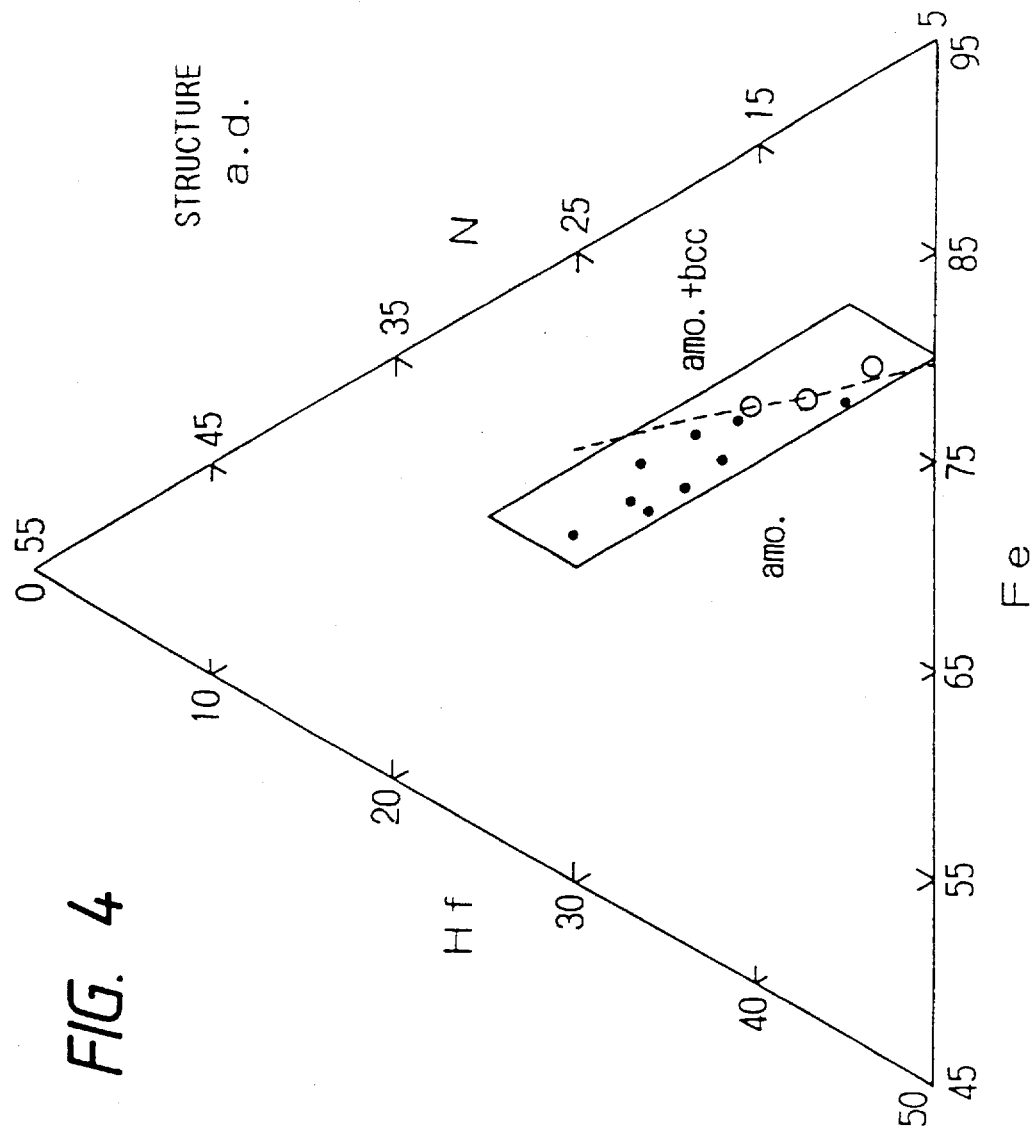
FIG. 4 is a triangular composition chart indicating the relationship between the composition of an Fe-Hf-N system and its structure.

FIG. 4 is a triangular composition chart indicating the relationship between the composition and structure of not-heat-treated samples of the Fe-Hf-N system.

In FIG. 4, the area indicated by "amo." is an amorphous phase, and an amorphous phase and crystalline phase are mixed in the area indicated by "amo.+bcc". In the composition range limited in the present invention, it was found that there existed two types of areas bordered by a dotted line. The symbol "a.d." in the figures indicates that a sample is not heat-treated (i.e., "as deposited").

Figure 5:
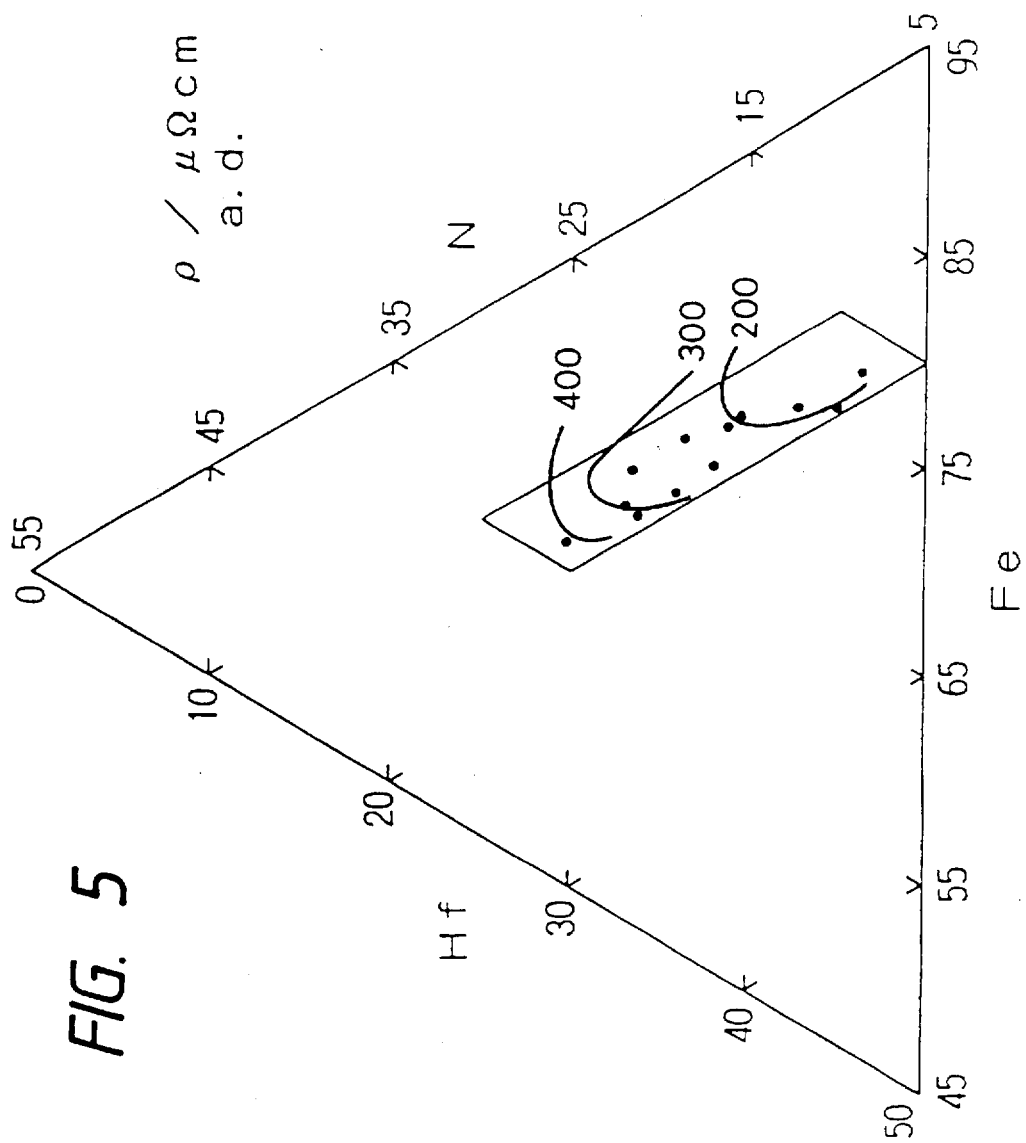
FIG. 5 is a triangular composition chart illustrating the relationship between the composition of an Fe-Hf-N system and its resistivity.

FIG. 5 is a triangular composition chart illustrating the relationship between the composition and resistivity (ρ) of not-heat-treated samples of an Fe-Hf-N system. In FIG. 5, thick lines indicate resistivities of 200, 300, and 400 μΩcm, respectively.

As clearly shown in FIG. 5, in the compositions according to the present invention, the resistivity increased as the Fe content became smaller and the N content became larger.

Figure 6:
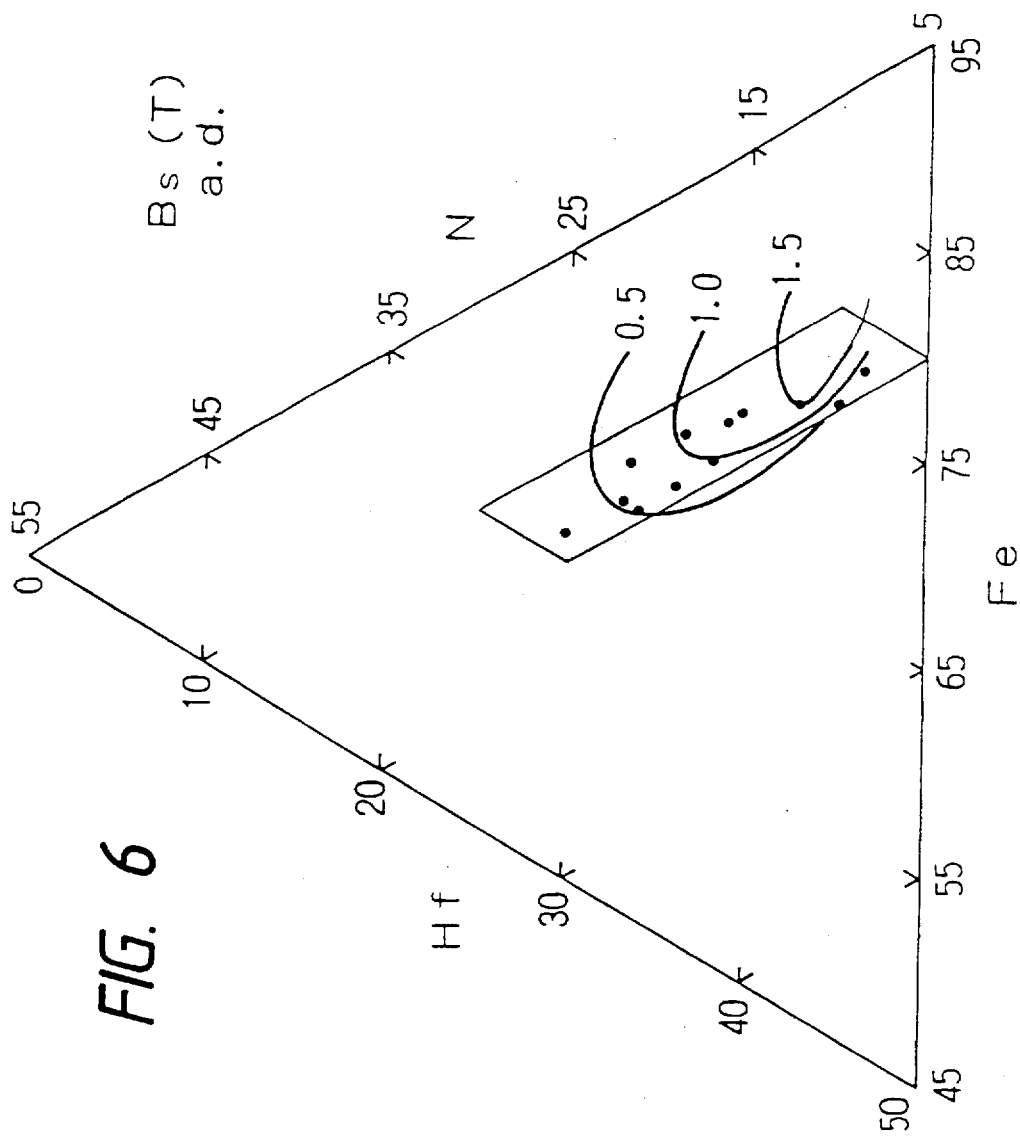
FIG. 6 is a triangular composition chart showing the relationship between the composition of an Fe-Hf-N system and its saturation magnetic flux density.

FIG. 6 is a triangular composition chart showing the relationship between the composition and saturation magnetic flux density (Bs) of not-heat-treated samples of an Fe-Hf-N system. Thick lines indicate saturation magnetic flux densities of 0.5 T, 1.0 T, and 1.5 T, respectively.

As clearly shown in FIG. 6, in the compositions according to the present invention, the saturation magnetic flux density increased as the Fe content became larger and the N content became smaller.

Figure 7:
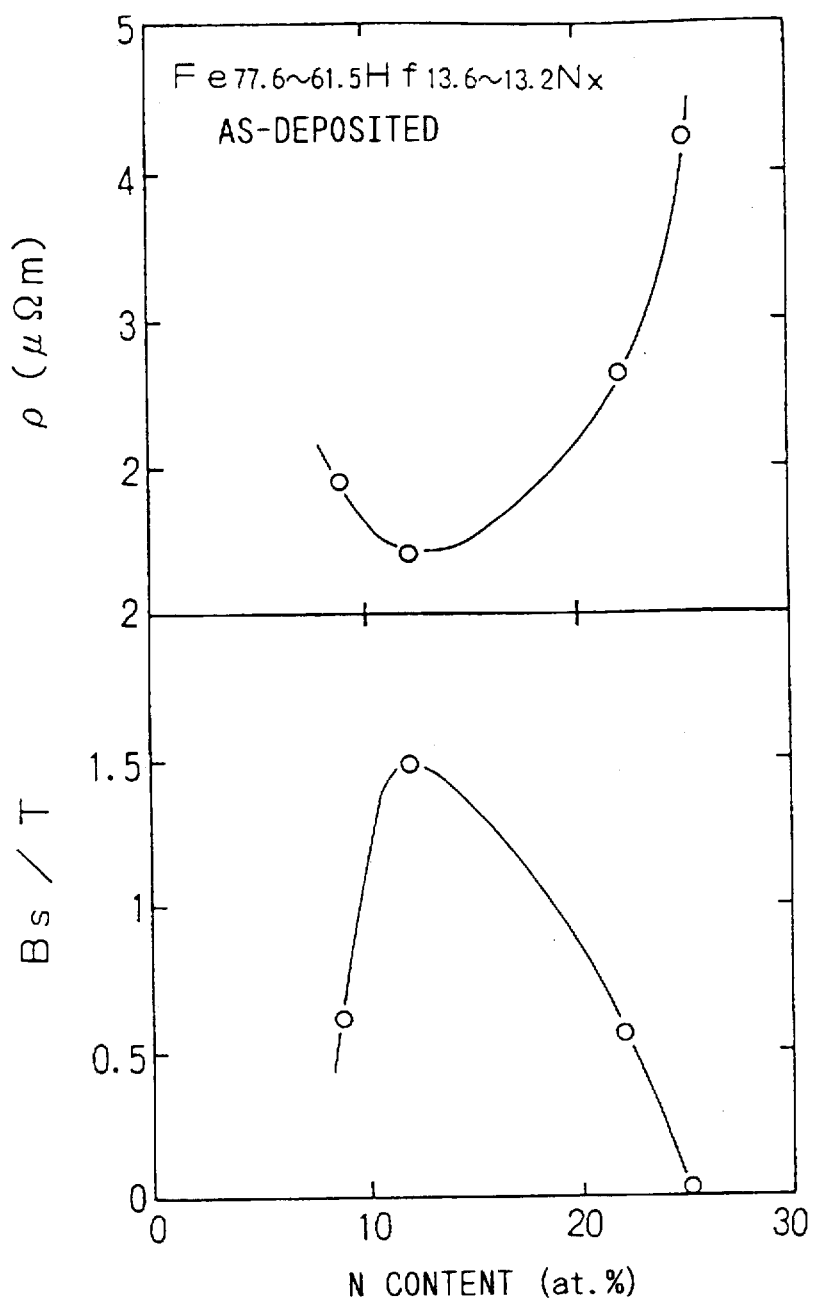
FIG. 7 shows the relationship between nitrogen content and saturation magnetic flux density, and the relationship between nitrogen content and resistivity of not-heat-treated samples having a compositional formula of $Fe_{77.6-61.5}Hf_{13.6-13.2}N_x$.

FIG. 7 shows the relationship between the nitrogen content and saturation magnetic flux density, and the relationship between the nitrogen content and resistivity, of not-heat-treated samples having a compositional formula of $Fe_{77.6}Hf_{13.6-13.2}N_x$.

As clearly shown in FIG. 7, the following items were found in the specified range of the Fe content. The nitrogen content be within the range of 5 atomic percent to 30 atomic percent in order to obtain saturation magnetic flux density. The nitrogen content must be within the range of 10 atomic percent to 22 atomic percent in order to obtain a saturation magnetic flux density of 0.5 T or more. The nitrogen content must be within the range of 10 atomic percent to 18 atomic percent in order to obtain a saturation magnetic flux density of 1.0 T or more.

Figure 8:
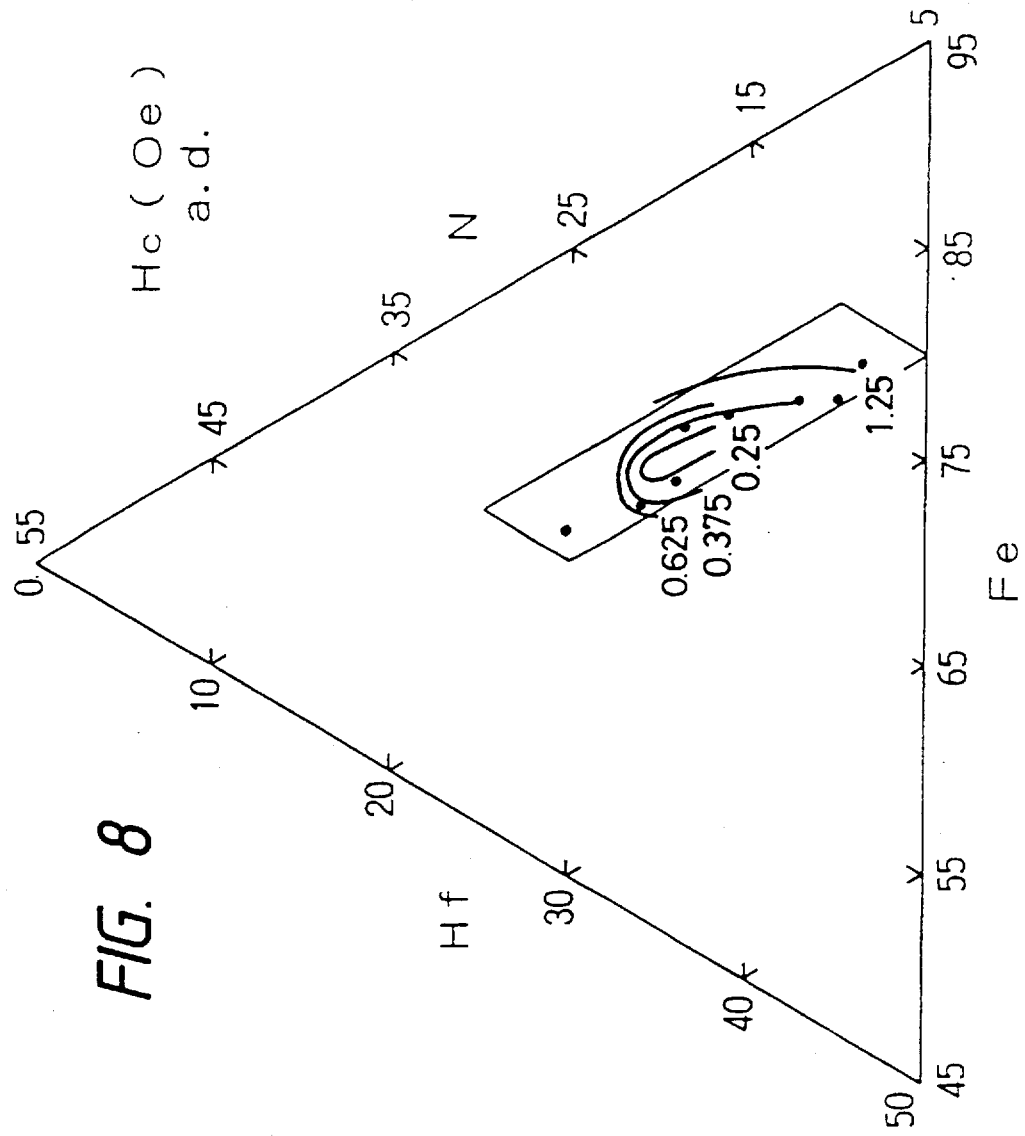
FIG. 8 is a triangular composition chart Showing the relationship between the composition of an Fe-Hf-N system and its coercive force.

FIG. 8 is a triangular composition chart showing the relationship between the composition and coercive force of not-heat-treated samples of an Fe-Hf-N system. In FIG. 8, thick lines indicate coercive forces of 0.25 Oe, 0.375 Oe, 0.625 Oe, and 1.25 Oe, respectively.

As clearly shown in FIG. 8, it was found that, in the composition system of the present invention, the coercive force was lower as the contents of the three elements were restricted to amounts indicated at the center of the boxed area according to the present invention.

Figure 9:
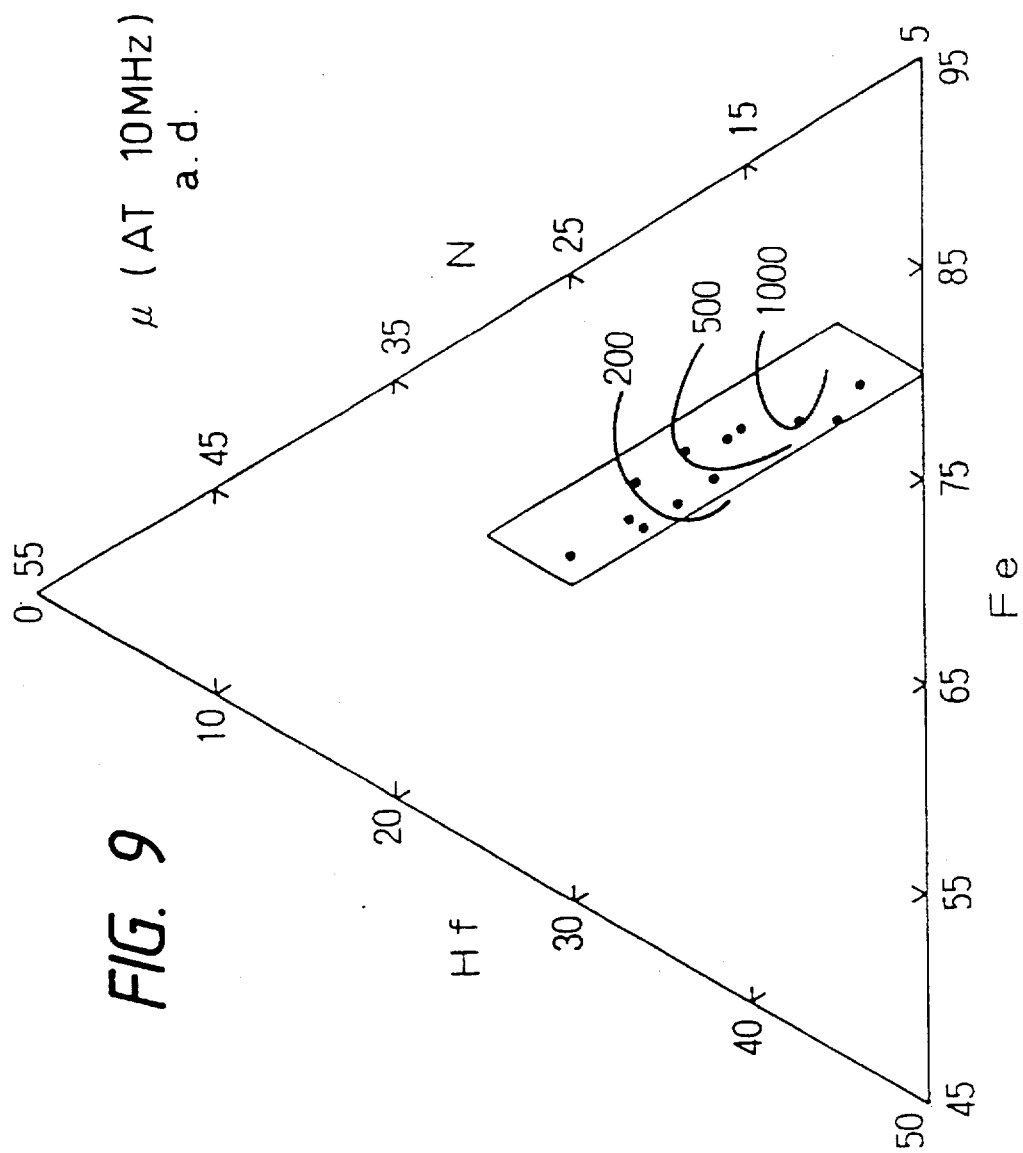
FIG. 9 is a triangular composition chart showing the relationship between the composition of an Fe-Hf-N system and its magnetic permeability.

FIG. 9 is a triangular composition chart showing the relationship between the composition and magnetic permeability μ (10 MHz) of not-heat-treated samples of an Fe-Hf-N system. In FIG. 9, thick lines indicate magnetic permeabilities of 200, 500, and 1,000, respectively.

As clearly shown in FIG. 9, it is obvious that, in the composition system of the present invention, higher magnetic permeability can be obtained as the Fe content is increased and the N content is decreased.

Figure 10:
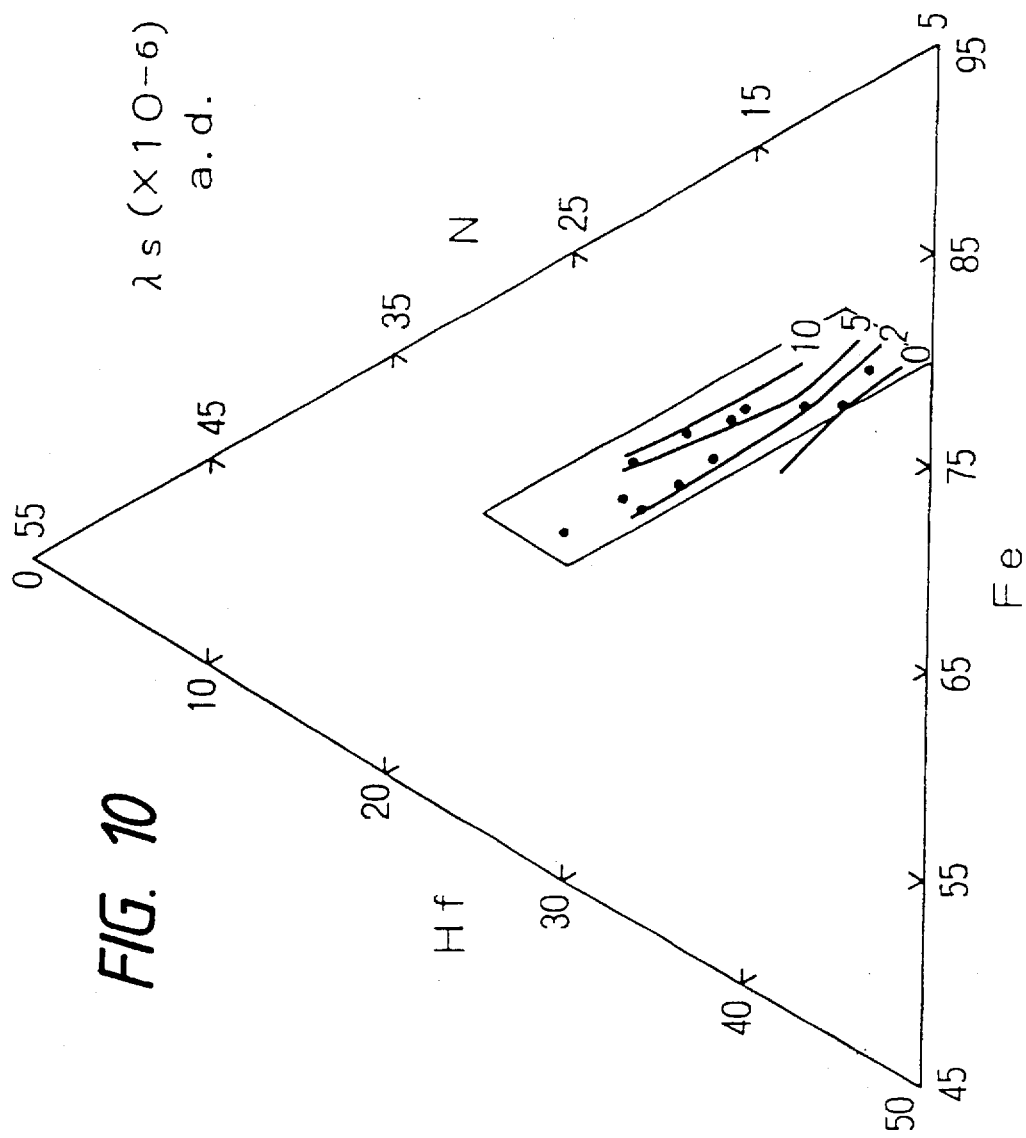
FIG. 10 is a triangular composition chart showing the relationship between the composition of an Fe-Hf-N system and its magnetostriction coefficient.

FIG. 10 is a triangular composition chart showing the relationship between the composition and magnetostriction (λs) of not-heat-treated samples of an Fe-Hf-N system. In FIG. 10, thick lines indicate borders of magnetostrictions of 0, $2\times10^{-6}$, $5\times10^{-6}$, and $10\times10^{-6}$.

As clearly shown in FIG. 10, it was found that, in the composition system of the present invention, the magnetostriction decreased as the Hf content increased and the Fe content decreased, and there existed an area where the magnetostriction was 0. Therefore, it is obvious that controlling the amount of Hf and Fe easily adjusts the magnetostriction, and the magnetostriction can be set to 0.

Figure 11:
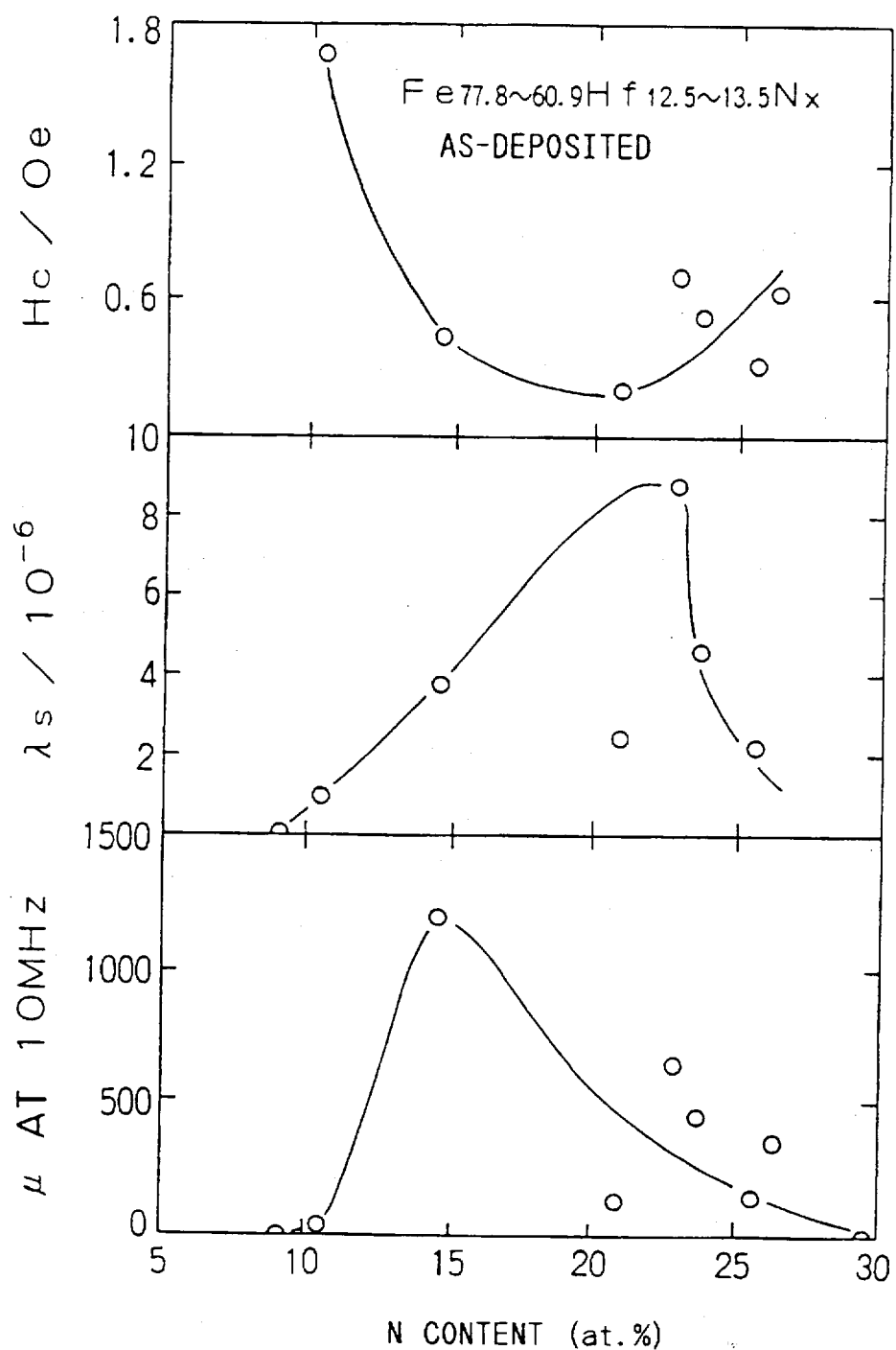
FIG. 11 shows the relationship between nitrogen content and magnetic permeability, the relationship between nitrogen content and magnetostriction, and the relationship between nitrogen content and coercive force of not-heat-treated samples having a compositional formula of $Fe_{77.8-60.9}Hf_{12.5-13.5}N_x$.

FIG. 11 shows the relationship between the nitrogen content and magnetic permeability μ (at 10 MHz), the relationship between the nitrogen content and magnetostriction (λs), and the relationship between the nitrogen content and coercive force (Hc), of not-heat-treated samples having a compositional formula of $Fe_{77.8-60.9}Hf_{12.5-13.5}N_x$.

FIG. 11 clearly shows that the magnetic permeability achieves a peak value at a nitrogen content of about 15 atomic percent, and decreased as the nitrogen content became greater or less than about 15 atomic percent. It also clearly shows that the magnetostriction achieves a peak value at a nitrogen content of about 21 to 23 atomic percent, and decreased as the nitrogen content became greater or less than this amount. FIG. 11 also shows that the coercive force was lowest at a nitrogen content of 14 to 24 atomic percent, and increased as the nitrogen content becomes larger than 24 atomic percent or smaller than 14 atomic percent.

Figure 12:
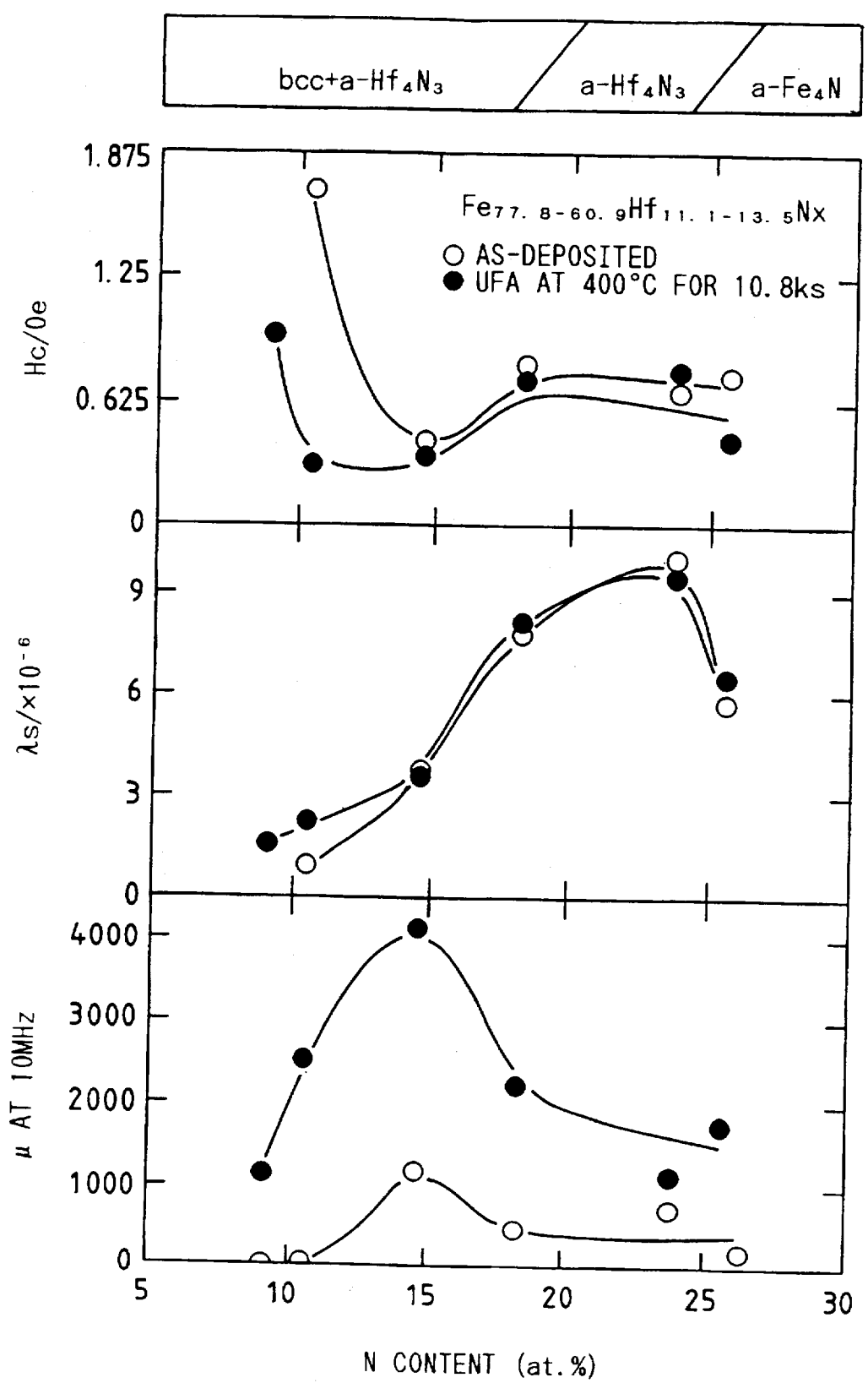
FIG. 12 shows the relationship between the nitrogen content and magnetic permeability, the relationship between nitrogen content and magnetostriction, and the relationship between nitrogen content and coercive force, of samples having a compositional formula of $Fe_{77.8-60.9}Hf_{11.1-13.5}N_x$.

FIG. 12 shows the relationship between the nitrogen content and magnetic permeability μ (at 10 MHz), the relationship between the nitrogen content and magnetostriction (ns), and the relationship between the nitrogen content and coercive force (Hc) of samples having a compositional formula of $Fe_{77.8-60.9}Hf_{11.1-13.5}N_x$. Data of samples not heat-treated (as deposited) was compared with that of samples annealed at 400° C. for $10.8 \times 10^3$ seconds in a magnetic field.

As clearly shown in FIG. 12, the magnetostriction and coercive force did not change substantially when the samples were annealed, but the magnetic permeability increased considerably. It is expected that a magnetic permeability of 1,000 or more can be obtained in thin films wherein the N content range is 5 atomic percent to 30 atomic percent. It is further expected that a magnetic permeability of 1,500 or more can be obtained in thin films wherein the N content range is 10 atomic percent to 30 atomic percent.

Figure 13:
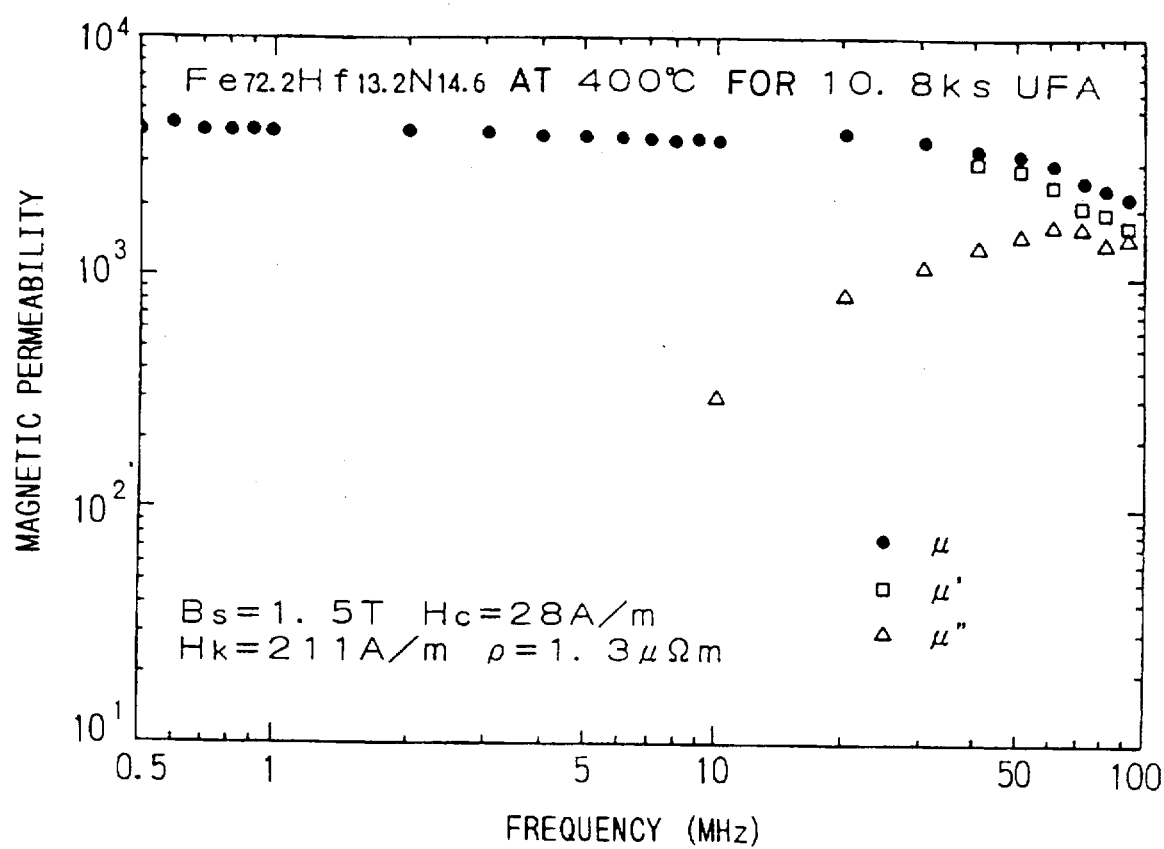
FIG. 13 is a graph showing magnetic permeability as a function of frequency for a sample having a composition formula of $Fe_{72.2}Hf_{13.2}N_{14.6}$ which has been annealed at 400° C. for $10.8 \times 10^3$ seconds in a magnetic field of 2 kOe.

FIG. 13 is a graph showing the magnetic permeability of a sample having a composition formula of $Fe_{72.2}Hf_{13.2}N_{14.6}$ which was annealed at 400° C. for $10.8 \times 10^3$ seconds in a magnetic field of 2 kOe.

In general, magnetic permeability μ is denoted as:

$$\mu = \mu' - i\mu''$$

where μ' represents the real component of the magnetic permeability and μ" represents the imaginary (complex) component of the magnetic permeability. Magnetic permeability μ can also be represented as follows:

$$|\mu| = (\mu'^2 + \mu''^2)^{0.5}.$$

Generally, imaginary component μ" can be ignored at low frequencies because it is insignificant, but it tends to become large at high frequencies, and therefore cannot be ignored.

However, the magnetic permeability of the sample according to the present invention shown in FIG. 13 exhibited an imaginary component μ" which was smaller than the real component μ' even at frequencies higher than 50 MHz, and μ did not decrease significantly. This indicates that the sample can be used at frequencies of as high as 100 MHz. The sample also exhibited a saturation magnetic flux density of 1.5 T, a coercive force of 28 A/m (=0.35 Oe), an anisotropic magnetic field of 211 A/m (=2.64 Oe), and a resistivity of 1.3 μΩm, these being superior soft magnetic properties.

Figure 14:
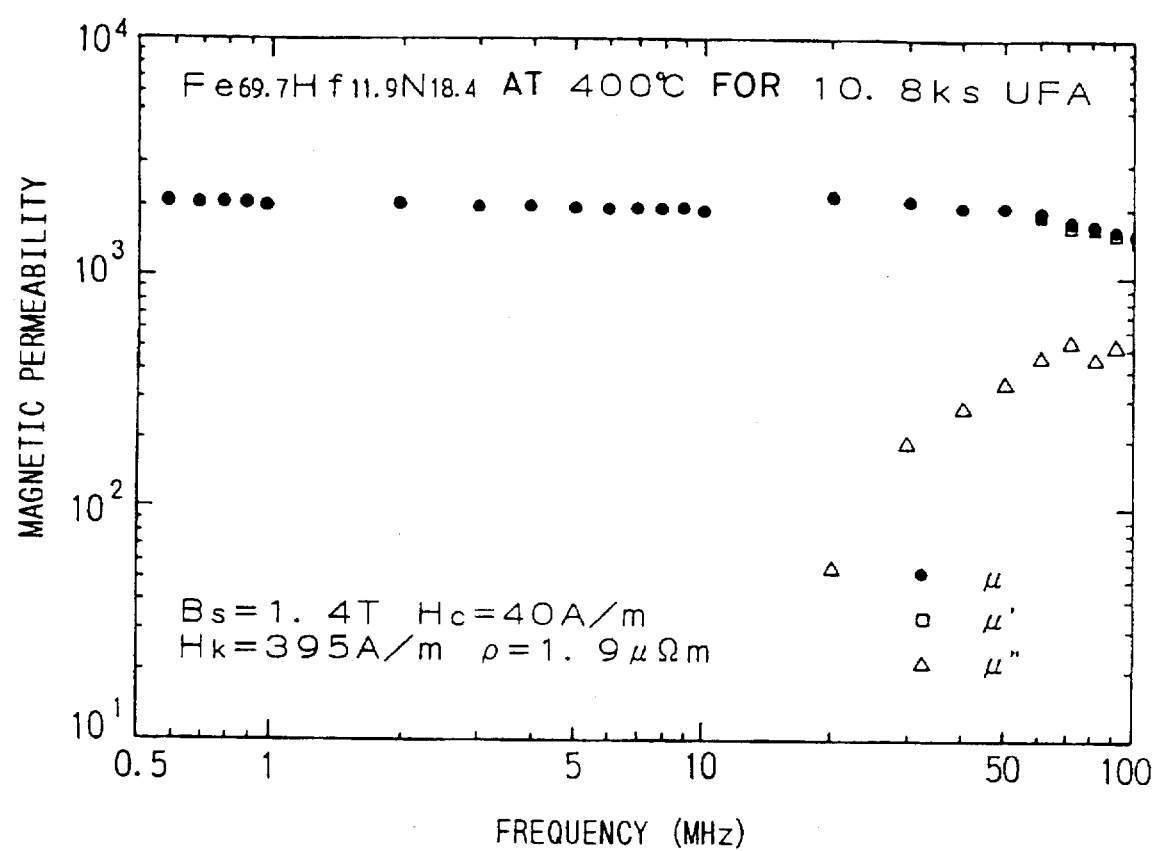
FIG. 14 is a graph showing magnetic permeability as a function of frequency for a sample having a composition formula of $Fe_{65.1}Hf_{11.1}N_{23.8}$ which has been annealed at 400° C. for $10.8 \times 10^3$ seconds in a magnetic field of 2 kOe.

FIG. 14 is a graph showing the magnetic permeability of a sample having a composition formula of $Fe_{69.7}Hf_{11.9}N_{18.4}$ which was annealed at 400° C. for $10.8 \times 10^3$ seconds in a magnetic field of 2 kOe.

It was found that this sample exhibited imaginary component μ" which was smaller than that of the sample shown in FIG. 13 at high frequencies, and it can be satisfactorily used at frequencies up to 100 MHz. This sample also exhibited a saturation magnetic flux density of 1.4 T, a coercive force of 40 A/m (=0.5 Oe), an anisotropic magnetic field of 395 A/m (=4.94 Oe), and a resistivity of 1.9 μΩm, these being superior magnetic properties.

Figure 15:
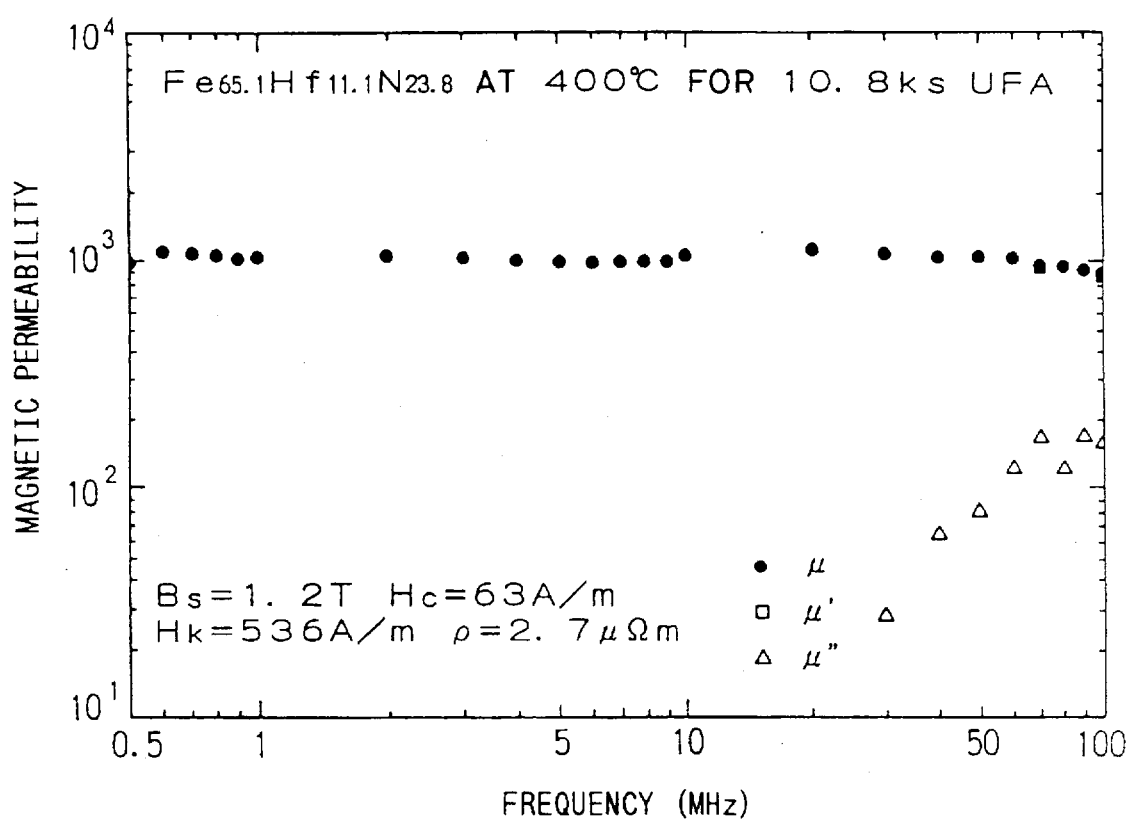
FIG. 15 is a graph showing magnetic permeability as a function of frequency for a sample having a composition formula of $Fe_{65.1}Hf_{11.1}N_{23.8}$ which has been annealed at 400° C. for $10.8 \times 10^3$ seconds in a magnetic field of 2 kOe.

FIG. 15 is a graph showing of the magnetic permeability of a sample having a composition formula of $Fe_{65.1}Hf_{11.1}N_{23.8}$ which was annealed at 400° C. for $10.8 \times 10^3$ seconds in a magnetic field of 2 kOe.

It was found that this sample exhibited an imaginary component μ" which was even smaller than that of the sample shown in FIG. 14 at high frequencies, and it can be satisfactorily used at frequencies up to 100 MHz. This sample also exhibited a saturation magnetic flux density of 1.2 T, a coercive force of 63 A/m (=0.788 Oe), an anisotropic magnetic field of 536 A/m (=6.70), and a resistivity of 270 μΩcm, these being superior magnetic properties.

Figure 16:
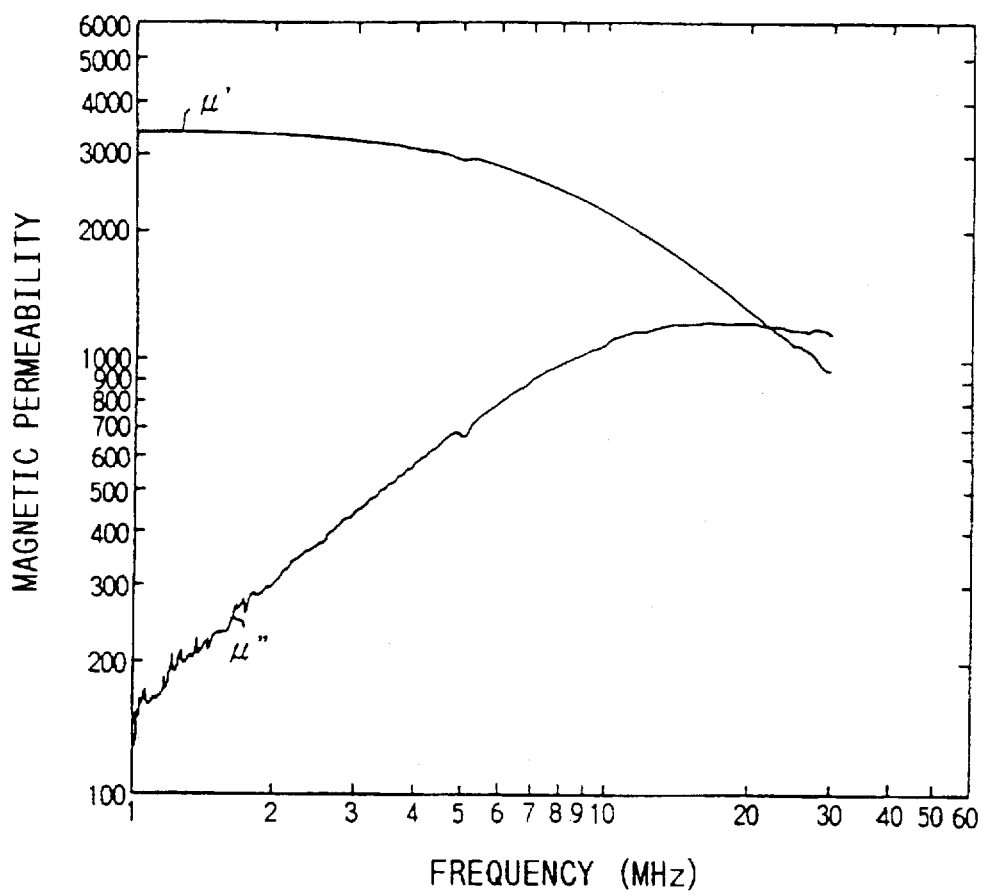
FIG. 16 is a graph showing magnetic permeability as a function of frequency for a soft magnetic alloy thin film having a composition formula of $Fe_{82.6}Hf_{7.7}N_{9.7}$ which has been annealed at 550° C. for six hours in a magnetic field of 1.1 kOe.

FIG. 16 is a graph showing the magnetic-permeability frequency characteristics of a sample of a soft magnetic alloy thin film having a composition formula of $Fe_{82.6}Hf_{7.7}N_{9.7}$ which was annealed at 550° C. for six hours in a magnetic field of 1.1 kOe. The crystalline soft magnetic alloy thin film produced by this process is disclosed in the specification of U.S. Pat. No. 5,117,321 (discussed above). When heat treatment is applied for a long period at a high temperature as that used for the measurement in FIG. 16, the whole structure becomes crystalline. The properties of the sample in this example are described in U.S. Pat. No. 5,117,321. As described above, the sample is inferior to the thin film produced in accordance with the present invention due to a large loss in magnetic permeability at frequencies higher than 20 MHz because the imaginary component μ" of the magnetic permeability is larger than the real component μ" at frequencies above 20 MHz.

In contrast with the above-described thin film, the soft magnetic alloy thin film according to the present invention which mainly comprises amorphous phases can have a low imaginary component of the magnetic permeability low even at high frequencies between 50 to 100 MHz, as shown in FIGS. 13, 14, and 15.

Figure 17:
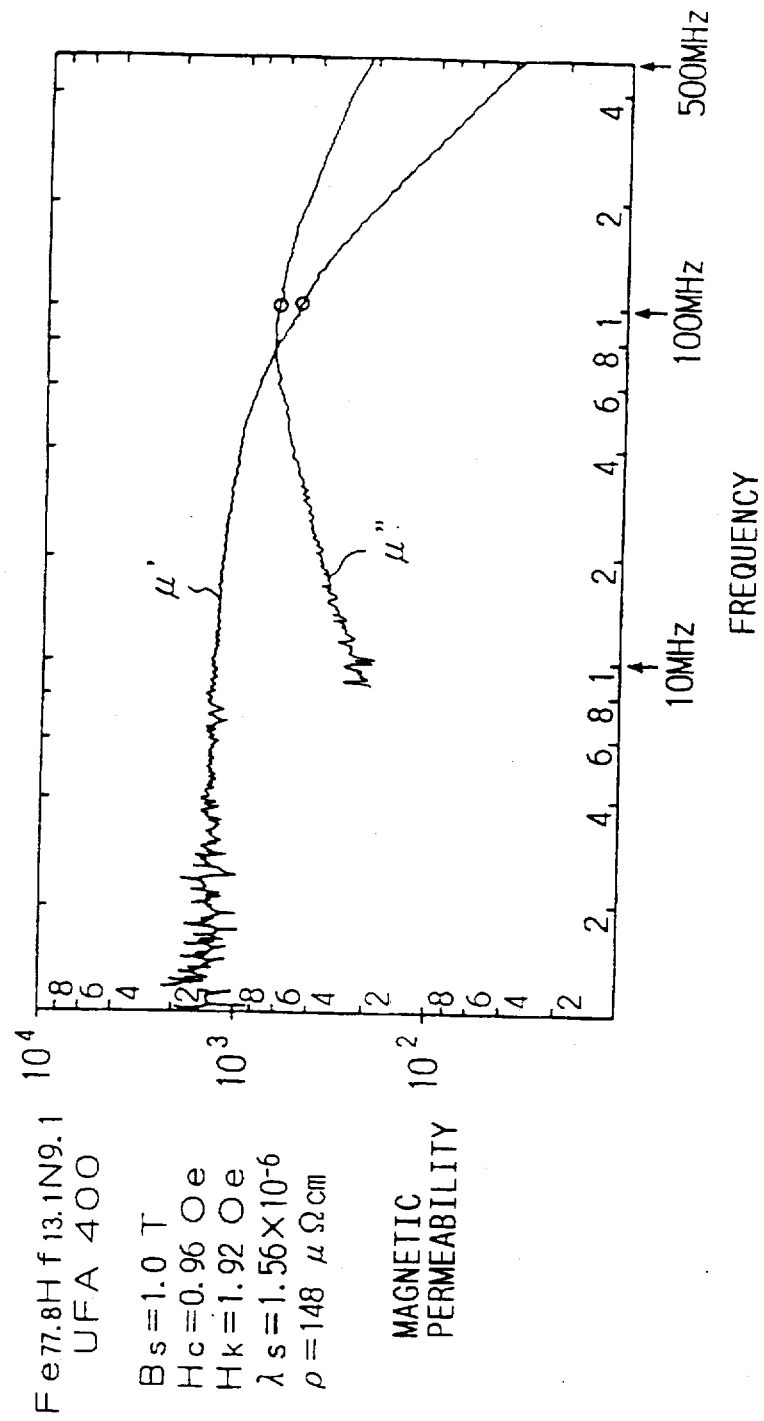
FIG. 17 is a graph showing magnetic permeability as a function of frequency for a soft magnetic alloy thin film having a composition formula of $Fe_{77.8}Hf_{13.1}N_{9.1}$ which has been annealed at 400° C. for $10.8 \times 10^3$ second in a magnetic field of 2 kOe.

FIG. 17 is a graph showing measurement results of the magnetic-permeability frequency characteristics of a sample of a soft magnetic alloy thin film having a composition formula of $Fe_{77.8}Hf_{13.1}N_{9.1}$ which was annealed at 400° C. for $10.8 \times 10^3$ seconds in a magnetic field of 2 kOe.

It was found that this sample exhibited an imaginary component μ" which was sufficiently small at frequencies below 100 MHz, and became larger than the real component μ" around 100 MHz. The sample is therefore satisfactory for use at frequencies up to 100 MHz. This sample also exhibited a saturation magnetic flux density of 1.0 T, a coercive force of 76.8 A/m (=0.96 Oe), an anisotropic magnetic field of 153.6 A/m (=1.92 Oe), a magnetostriction of $1.56 \times 10^6$, and a resistivity of 148 μΩcm, these being superior magnetic properties.

Figure 18:
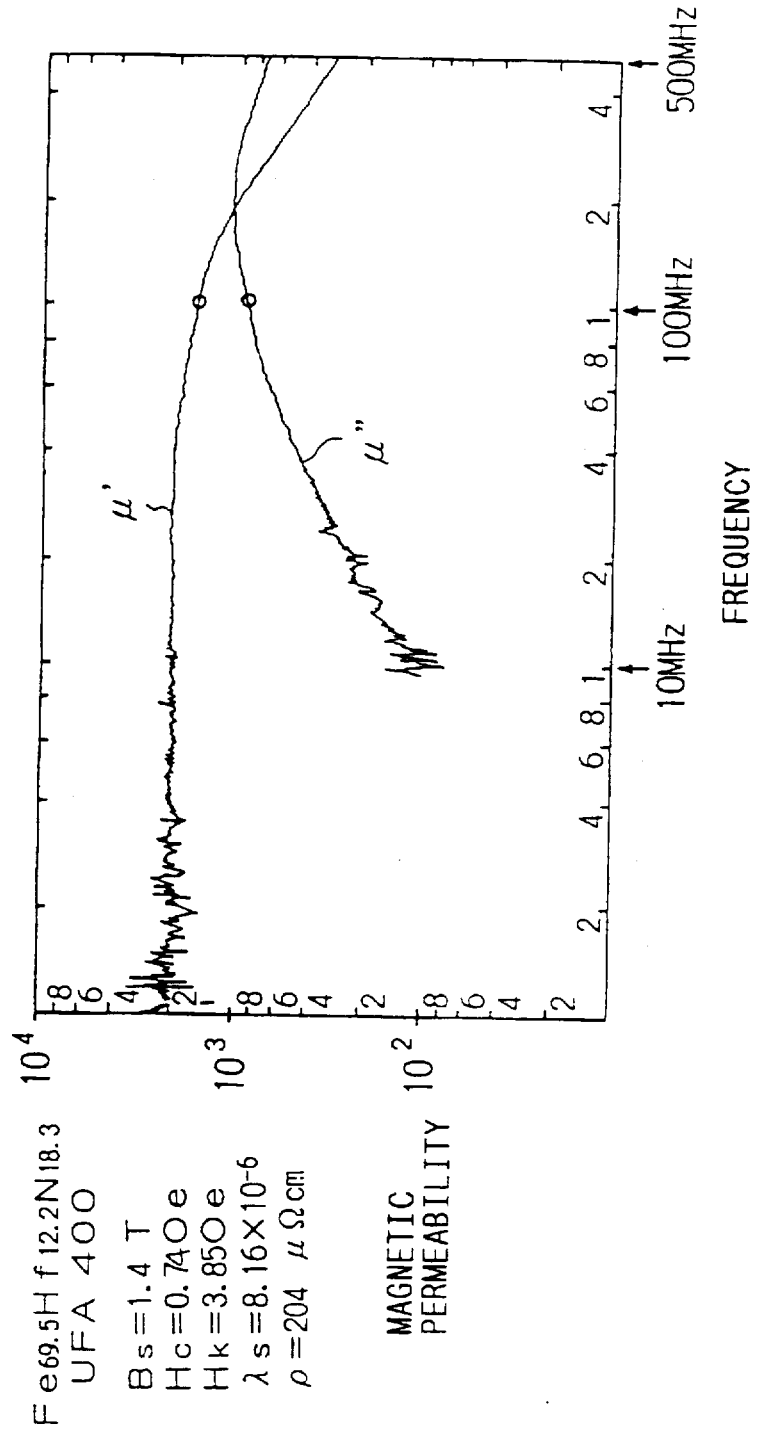
FIG. 18 is a graph showing magnetic permeability as a function of frequency for a soft magnetic alloy thin film having a composition formula of $Fe_{69.5}Hf_{12.2}N_{18.3}$ which has been annealed at 400° C. for $10.8 \times 10^3$ seconds in a magnetic field of 2 kOe.

FIG. 18 is a graph showing the magnetic-permeability frequency characteristics of a sample of a soft magnetic alloy thin film having a composition formula of $Fe_{69.5}Hf_{12.2}N_{18.3}$ which was annealed at 400° C. for $10.8 \times 10^3$ seconds in a magnetic field of 2 kOe.

It was found that this sample exhibited an imaginary component μ" which was sufficiently small at frequencies below 200 MHz, and became larger than the real component μ" around 200 MHz. The sample can be satisfactorily used at frequencies up to about 200 MHz. This sample also had a saturation magnetic flux density of 1.4 T, a coercive force of 59.2 A/m (=0.74 Oe), an anisotropic magnetic field of 308 A/m (=3.85 Oe), a magnetostriction of $8.16 \times 10^{-6}$, and a resistivity of 204 μΩcm, these being superior magnetic properties.

Figure 19:
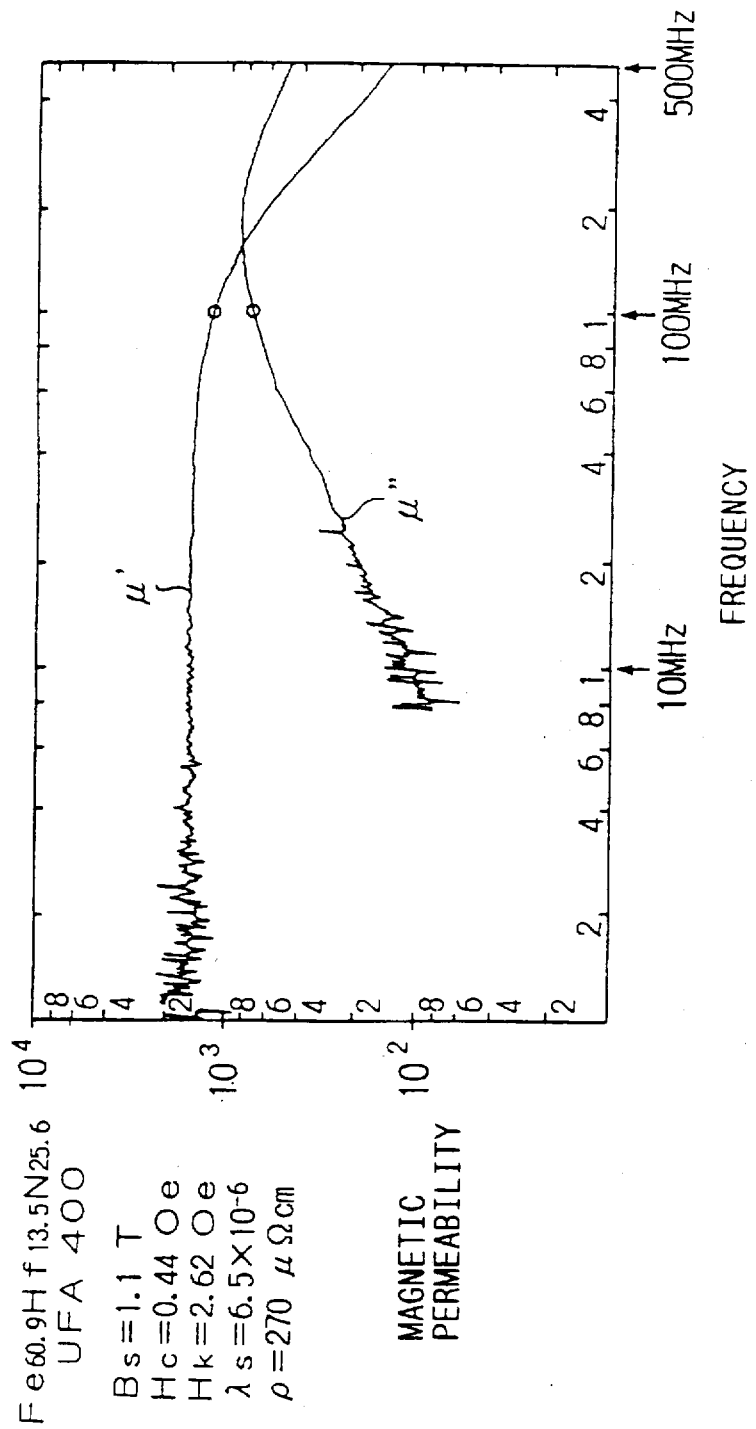
FIG. 19 is a graph showing magnetic permeability as a function of frequency for a soft magnetic alloy thin film having a composition formula of $Fe_{60.9}Hf_{13.5}N_{25.6}$ which has been annealed at 400° C. for $10.8 \times 10^3$ seconds in a magnetic field of 2 kOe.

FIG. 19 is a graph showing the magnetic-permeability frequency characteristics of a sample of a soft magnetic alloy thin film having a composition formula of $Fe_{60.9}Hf_{13.5}N_{25.6}$ which was annealed at 400° C. for $10.8 \times 10^3$ seconds in a magnetic field of 2 kOe.

It was found that this sample exhibited an imaginary component μ" which was sufficiently small at frequencies below 100 MHz, and became larger than the real component μ" between 100 MHz and 200 MHz. The sample can be satisfactorily used at frequencies between 100 MHz and 200 MHz. This sample also exhibited a saturation magnetic flux density of 1.1 T, a coercive force of 35.2 A/m (=0.44 Oe), an anisotropic magnetic field of 210 A/m (=2.62 Oe), a magnetostriction of $6.5 \times 10^6$ and a resistivity of 270 μΩcm, these being superior magnetic properties.

Figure 20:
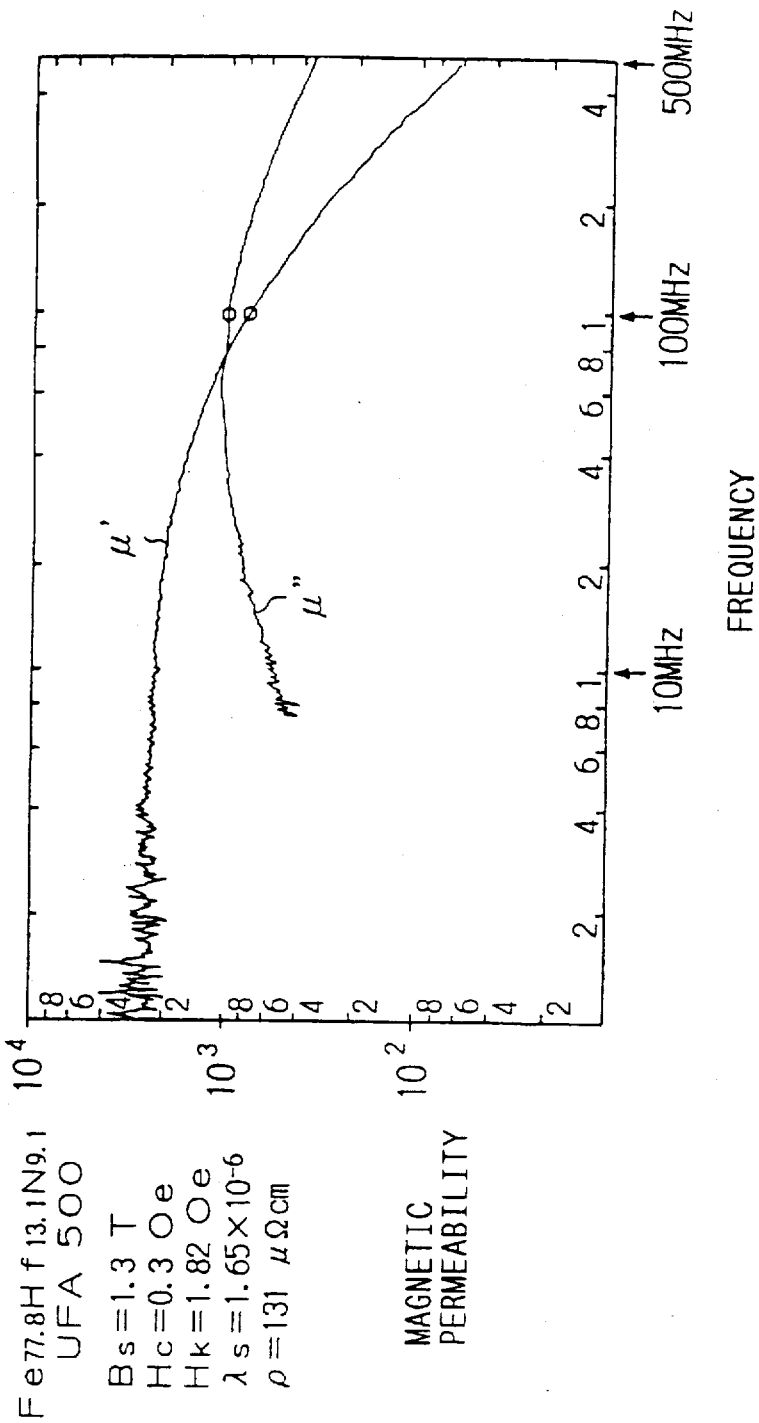
FIG. 20 is a graph showing magnetic permeability as a function of frequency for a soft magnetic alloy thin film having a composition formula of $Fe_{77.8}Hf_{13.1}N_{9.1}$ which has been annealed at 500° C. for $10.8 \times 10^3$ seconds in a magnetic field of 2 kOe.

FIG. 20 is a graph showing the magnetic-permeability frequency characteristics of a sample of a soft magnetic alloy thin film having a composition formula of $Fe_{77.8}Hf_{13.1}N_{9.1}$ which was annealed at 500° C. for $10.8 \times 10^3$ seconds in a magnetic field of 2 kOe.

It was found that this sample exhibited an imaginary component μ" which was sufficiently small at frequencies below 80 MHz, and became larger than the real component μ" around 80 MHz. The sample can be satisfactorily used at frequencies up to 80 MHz. This sample also exhibited a saturation magnetic flux density of 1.3 T, a coercive force of 24 A/m (=0.3 Oe), an anisotropic magnetic field of 134.6 A/m (=1.82 Oe), a magnetostriction of $1.65 \times 10^{-6}$, and a resistivity of 131 μΩcm, these being superior magnetic properties.

Figure 21:
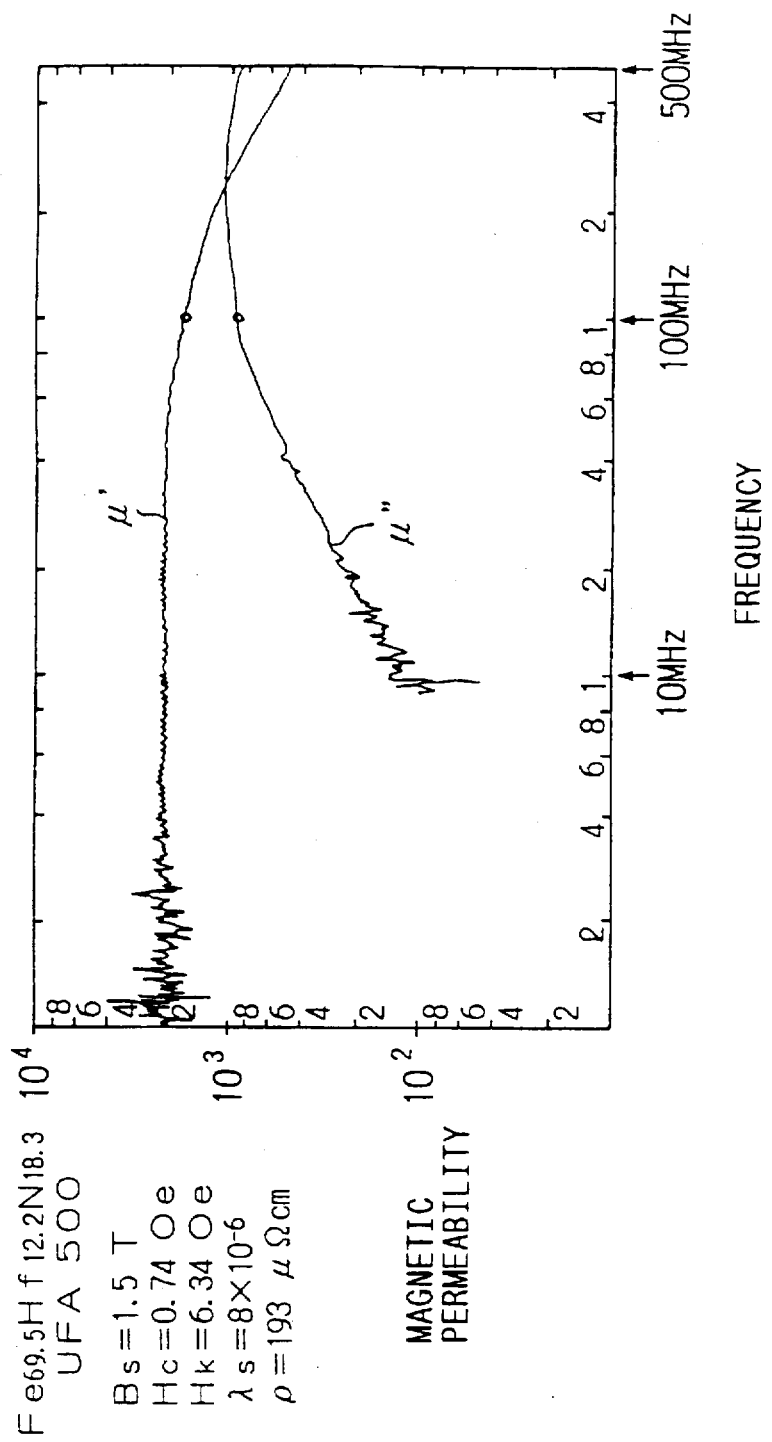
FIG. 21 is a graph showing magnetic permeability as a function of frequency for a soft magnetic alloy thin film having a composition formula of $Fe_{60.9}Hf_{13.5}N_{25.6}$ which has been annealed at 500° C. for $10.8 \times 10^3$ seconds in a magnetic field of 2 kOe.

FIG. 21 is a graph showing the magnetic-permeability frequency characteristics of a sample of a soft magnetic alloy thin film having a composition formula of $Fe_{69.5}Hf_{12.2}N_{18.3}$ which was annealed at 500° C. for $10.8 \times 10^3$ seconds in a magnetic field of 2 kOe.

It was found that this sample exhibited an imaginary component μ" which was sufficiently small at frequencies below 200 MHz, and became larger than the real component μ" around 200 MHz. The sample can be satisfactorily used at frequencies up to about 200 MHz. This sample also exhibited a saturation magnetic flux density of 1.5 T, a coercive force of 59.2 A/m (=0.74 Oe), an anisotropic magnetic field of 507.2 A/m (=6.34 Oe), a magnetostriction of $8 \times 10^{-6}$, and a resistivity of 193 μΩcm, these being superior magnetic properties.

Figure 22:
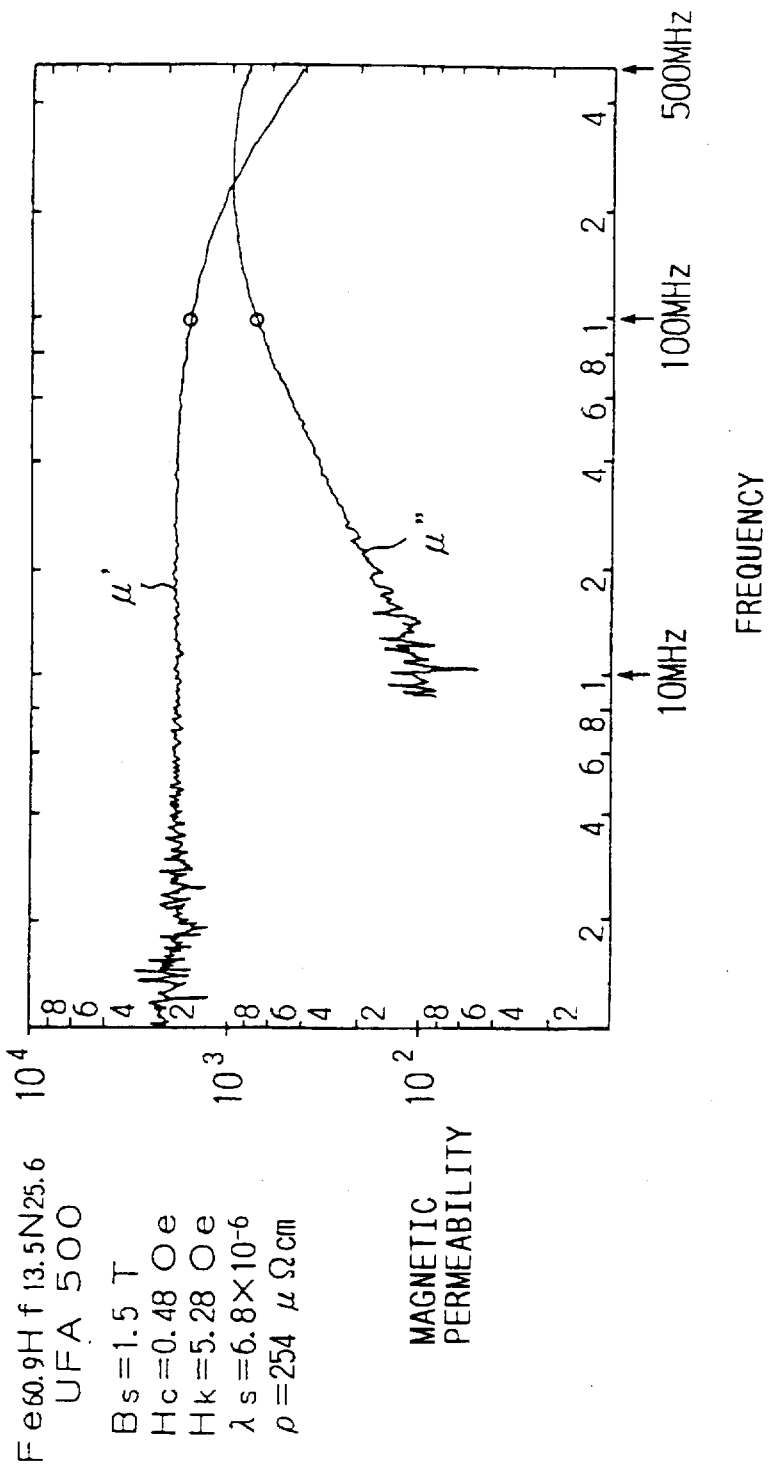
FIG. 22 is a graph showing magnetic permeability as a function of frequency for a soft magnetic alloy thin film having a composition formula of $Fe_{60.9}Hf_{13.5}N_{25.6}$ which has been annealed at 500° C. for $10.8 \times 10^3$ seconds in a magnetic field of 2 kOe.

FIG. 22 is a graph showing the magnetic-permeability frequency characteristics of a sample of a soft magnetic alloy thin film having a composition formula of $Fe_{60.9}Hf_{13.5}N_{25.6}$ which was annealed at 500° C. for $10.8 \times 10^3$ seconds in a magnetic field of 2 kOe.

It was found that this sample exhibited an imaginary component μ" which was sufficiently small at frequencies below 200 MHz, and became larger than the real component μ" around 200 MHz. The sample can be satisfactorily used at frequencies up to 200 MHz. This sample also had a saturation magnetic flux density of 1.5 T, a coercive force of 38.4 A/m (=0.48 Oe), an anisotropic magnetic field of 422.4 A/m (=5.28 Oe), a magnetostriction of $6.8 \times 10^{31\ 6}$, and a resistivity of 254 μΩcm, these being superior magnetic properties.

It is clear from the results shown in FIGS. 17 to 22, that the soft magnetic alloy thin film according to the present invention can be used for magnetic devices which require large magnetostriction and high magnetic permeability, such as magnetic surface acoustic wave devices, because the thin film has high magnetic permeability at high frequencies even though it exhibits large magnetostriction. When the N content is set to 18.3 atomic percent or more, the imaginary component μ" can be insignificant even at frequencies above 200 MHz, thereby minimizing the reduction of magnetic permeability.

Figure 23:
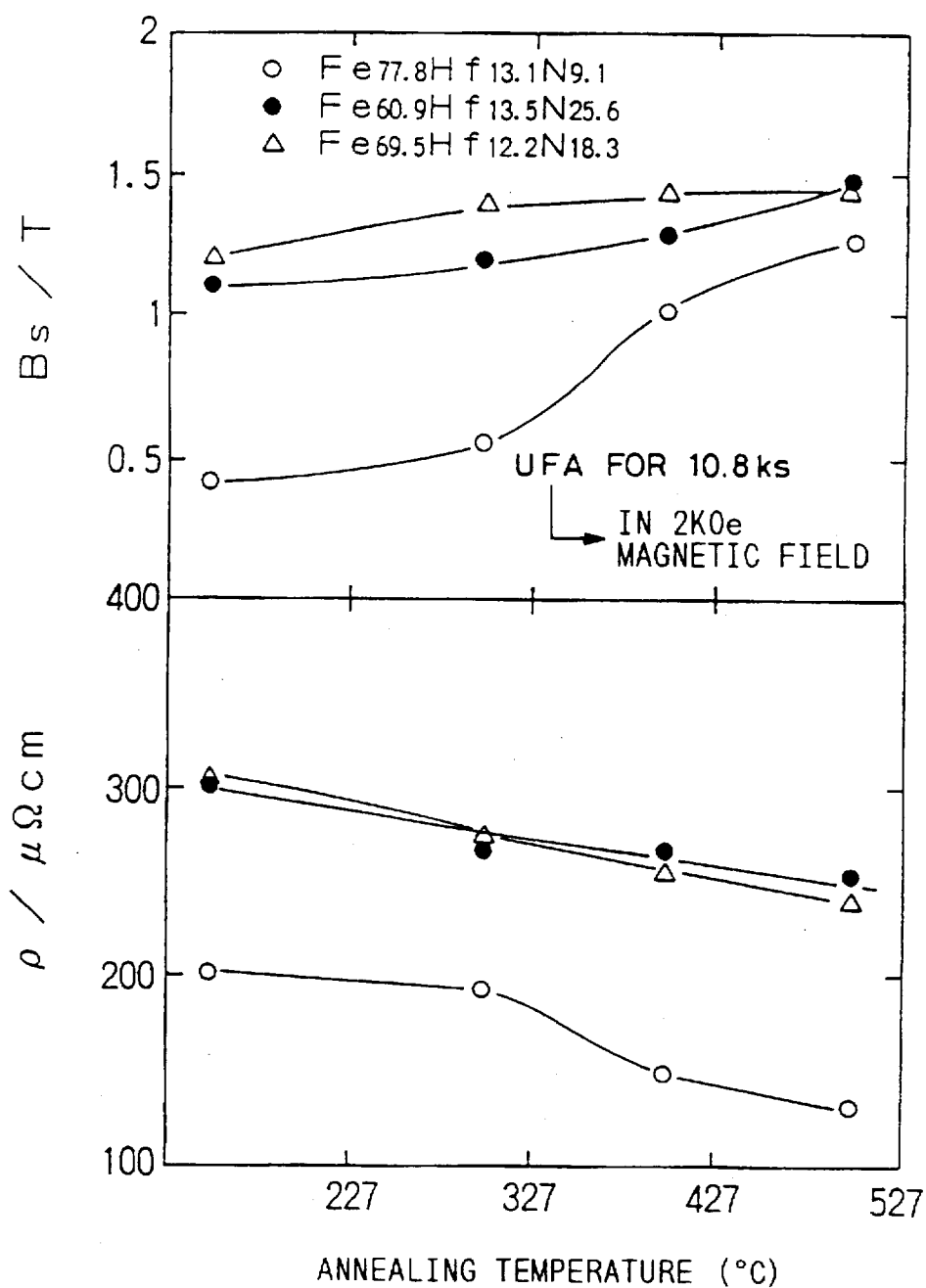
FIG. 23 shows the relationship between annealing temperature and resistivity, and the relationship between annealing temperature and saturation magnetic flux density of three samples having compositional formulas of $Fe_{77.8}Hf_{13.1}N_{9.1}$, $Fe_{60.9}Hf_{13.5}N_{25.6}$, and $Fe_{69.5}Hf_{12.2}N_{18.3}$, respectively.

FIG. 23 shows the relationship between the annealing temperature and resistivity, and the relationship between the annealing temperature and saturation magnetic flux density, of samples having compositional formulas of $Fe_{77.8}Hf_{13.1}N_{9.1}$, $Fe_{60.9}Hf_{13.5}N_{25.6}$, and $Fe_{69.5}Hf_{12.2}N_{18.3}$.

It was clear from the results shown in FIG. 23 that the resistivity of all the samples slightly decreased and the saturation magnetic flux density slightly or substantially increased, depending on the samples, as the annealing temperature increased.

Figure 24:
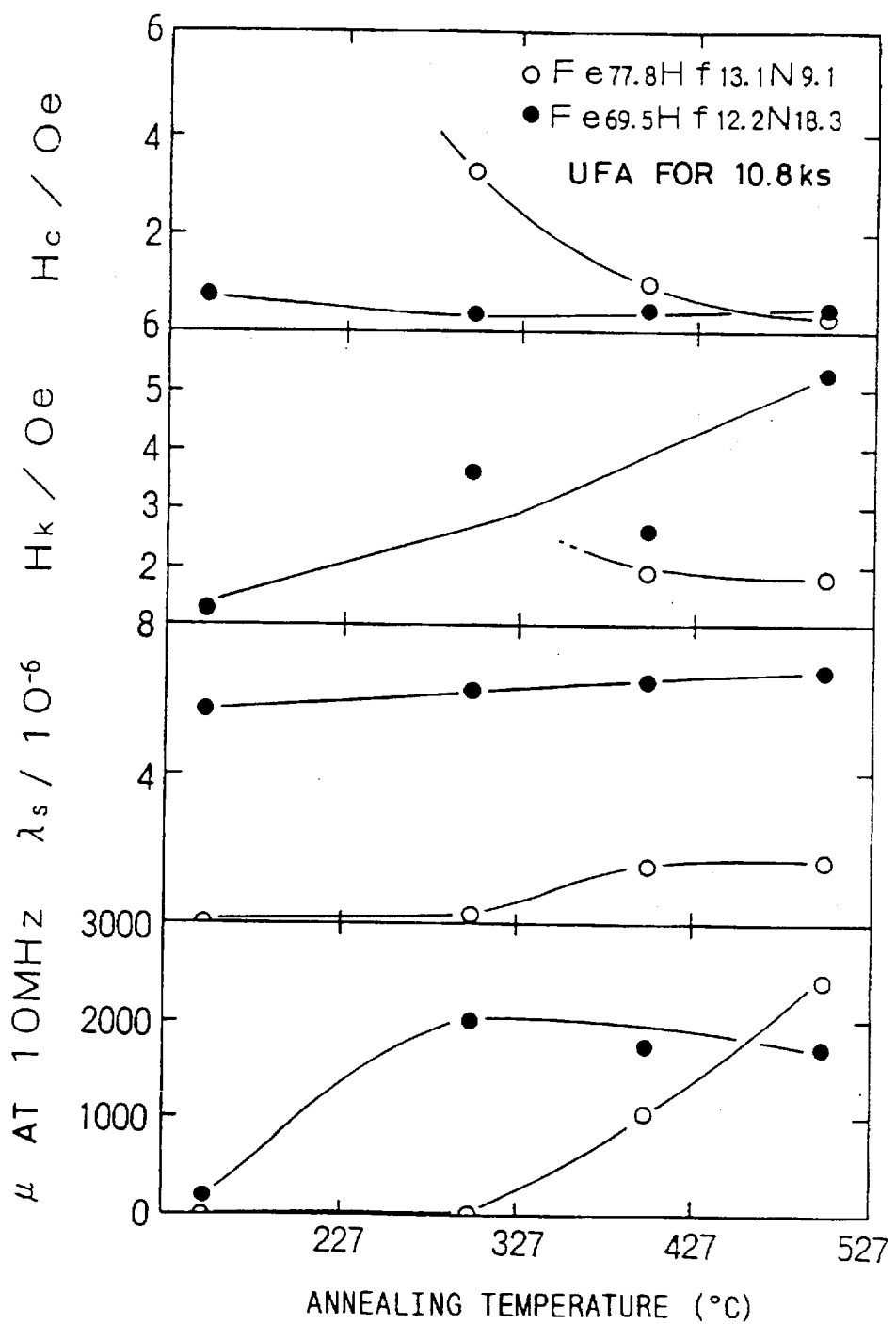
FIG. 24 shows the relationship between annealing temperature and magnetic permeability, the relationship between annealing temperature and magnetostriction, the relationship between annealing temperature and anisotropic magnetic field, and the relationship between annealing temperature and coercive force of samples having compositional formulas of $Fe_{77.8}Hf_{13.1}N_{9.1}$, and $Fe_{69.5}Hf_{12.2}N_{18.3}$, respectively.

FIG. 24 shows the relationship between the annealing temperature and magnetic permeability, the relationship between the annealing temperature and magnetostriction, the relationship between the annealing temperature and anisotropic magnetic field, and the annealing temperature and coercive force, of samples having compositional formulas of $Fe_{77.8}Hf_{13.1}N_{9.1}$ and $Fe_{69.5}Hf_{12.2}N_{18.3}$.

It was found from the results shown in FIG. 24 that the annealing temperature rarely affected the magnetostriction, but significantly affected the magnetic permeability and anisotropic magnetic field.

Figure 25:
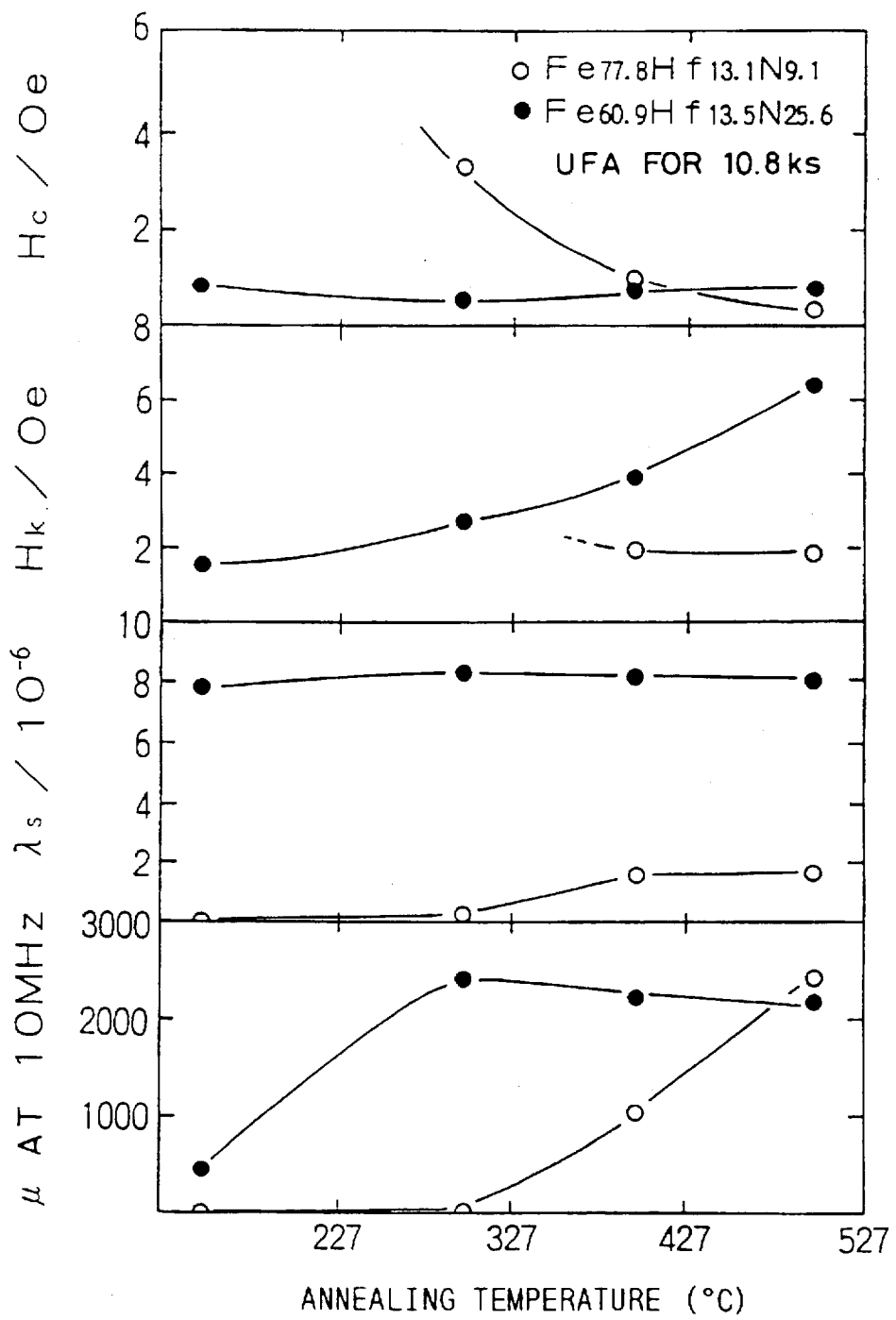
FIG. 25 shows the relationship between annealing temperature and magnetic permeability, the relationship between annealing temperature and magnetostriction, the relationship between annealing temperature and anisotropic magnetic field, and the relationship between annealing temperature and coercive force of samples having compositional formulas of $Fe_{77.8}Hf_{13.1}N_{9.1}$ and $Fe_{60.9}Hf_{13.5}N_{25.6}$, respectively.

FIG. 25 shows the same relationship as that shown in FIG. 24, measured for a sample having a compositional formula of $Fe_{60.9}Hf_{13.5}N_{25.6}$. The results similar to those shown in FIG. 24 were obtained for the sample having this composition.

Figure 26:
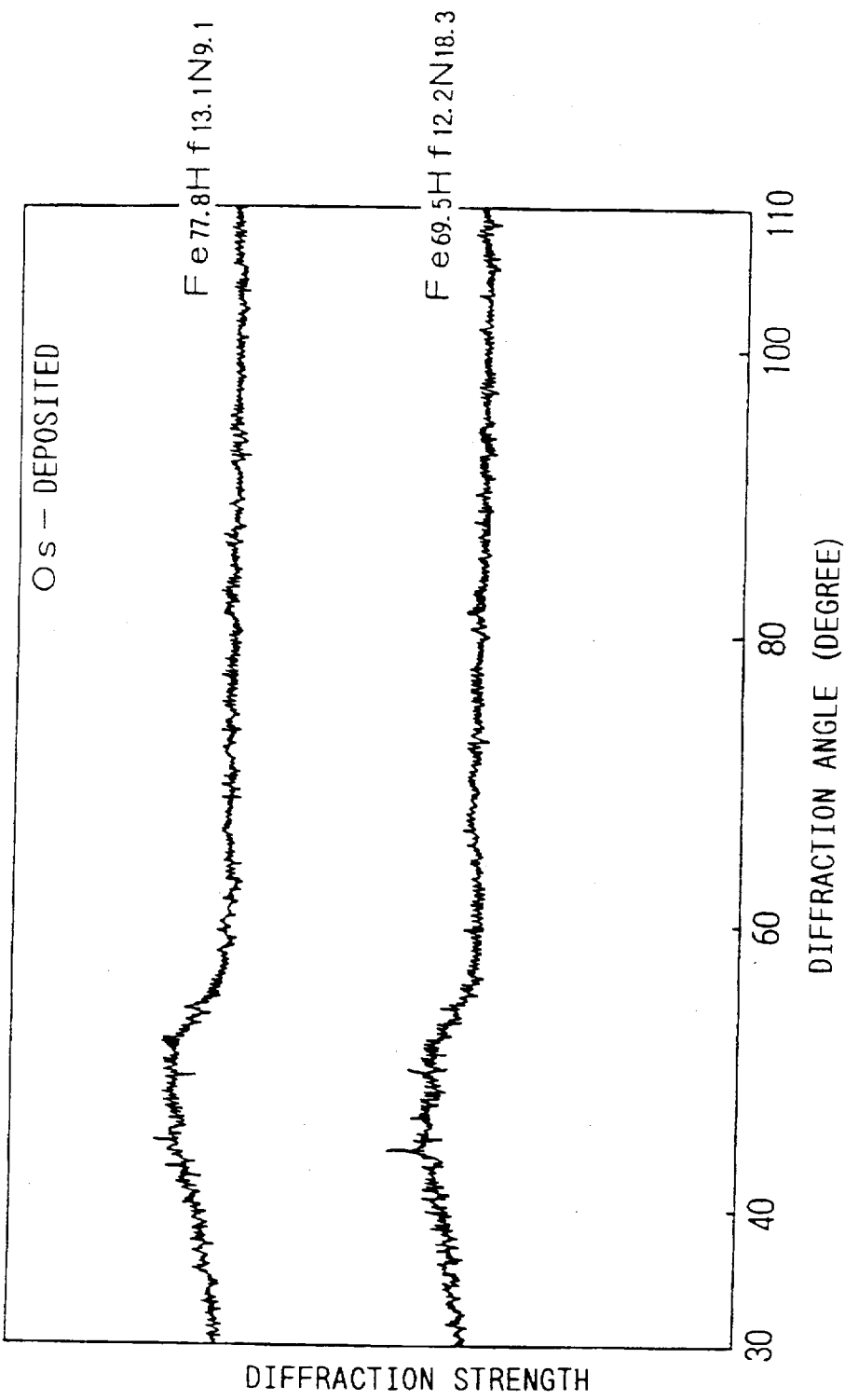
FIG. 26 shows the X-ray diffraction patterns of samples having compositional formulas of $Fe_{77.8}Hf_{13.1}N_{9.1}$ and $Fe_{69.5}Hf_{12.2}N_{18.3}$, respectively.

FIG. 26 shows X-ray diffraction patterns of samples having compositional formulas of $Fe_{77.8}Hf_{13.1}N_{9.1}$ and $Fe_{69.5}Hf_{12.2}N_{18.3}$ which were used in the measurement shown in FIGS. 24 and 25.

Since both samples showed broad peaks unique to an amorphous phases at diffraction angles of 40 to 60 degrees, it was determined that the samples were mainly made up of amorphous phases.

Figure 27:
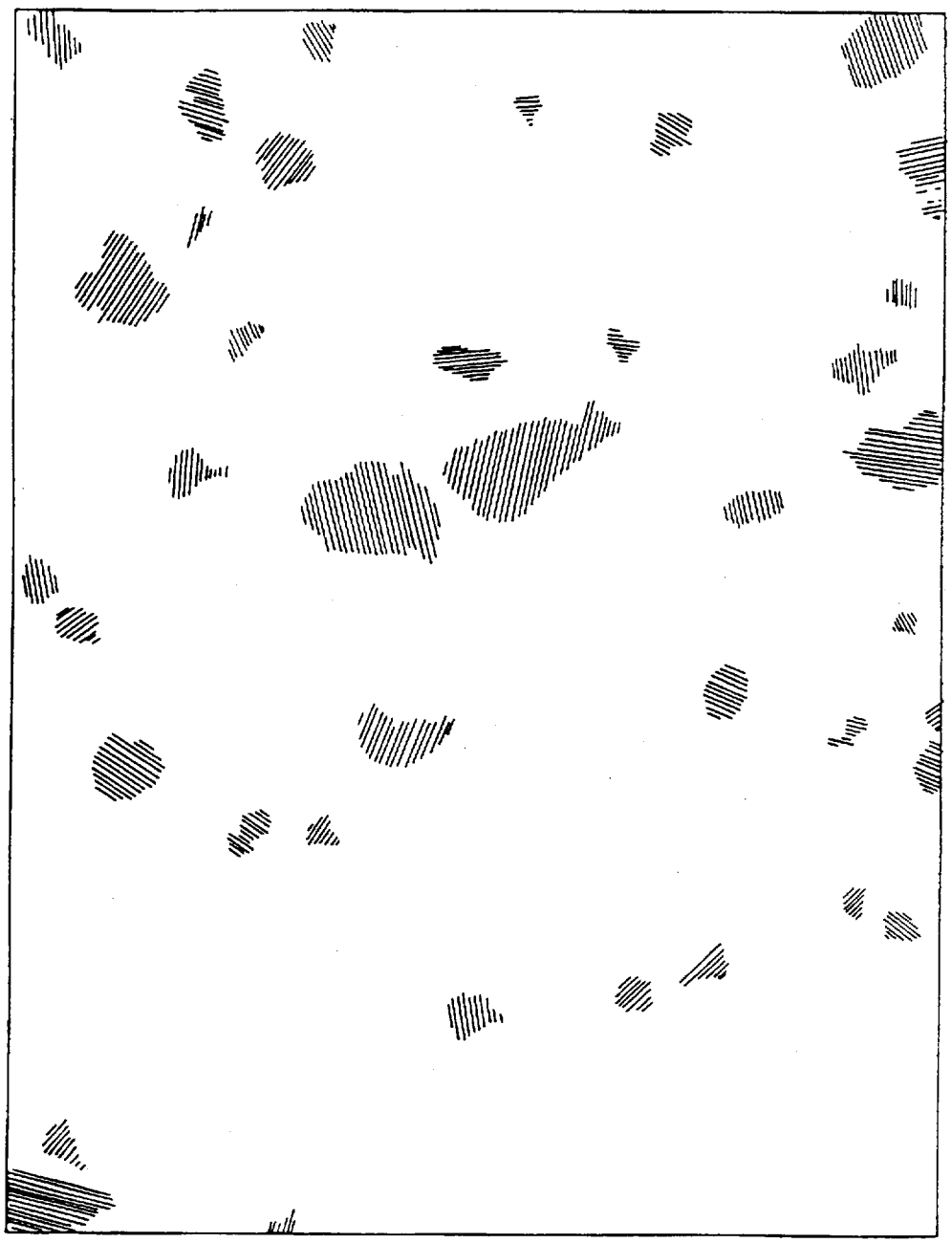
FIG. 27 is a sketch showing a metal structure, magnified 3.2 million times, of a sample having a compositional formula of $Fe_{72.2}Hf_{13.2}N_{14.6}$, which has been annealed at 400° C. for $10.8 \times 10^3$ seconds in a magnetic field of 2 kOe.
Figure 28:
FIG. 28 is a sketch showing a metal structure, magnified 3.2 million times, of a sample having a compositional formula of $Fe_{72.2}Hf_{13.2}N_{14.6}$ which has been annealed at 900° C. for $10.8 \times 10^3$ seconds in a magnetic field of 2 kOe.

FIGS. 27 and 28 are sketches showing a typical structure appearing in a photograph, magnified 3.2 million times, of a sample having a compositional formula of $Fe_{72.2}Hf_{13.2}N_{14.6}$ which was annealed at 400° C. for $10.8 \times 10^3$ seconds in a magnetic field of 2 kOe. In both figures, hatched areas represent crystalline structures and the unshaded areas indicate an amorphous phase. It is clear from these figures that the soft magnetic alloy thin films according to the present invention are mainly made up of an amorphous phase in which fine-crystalline grains are dispersed. With a scale of 6 nm indicated in the figures, it was found that each crystalline grain had a diameter of about 20 nm or less.

Samples having similar compositional formulas, wherein other elements M are substituted for Hf, have similar metal structures. It is quite expected that these samples have superior magnetic properties at frequencies higher than 10 MHz due to their alloy structures.

Figure 29A:
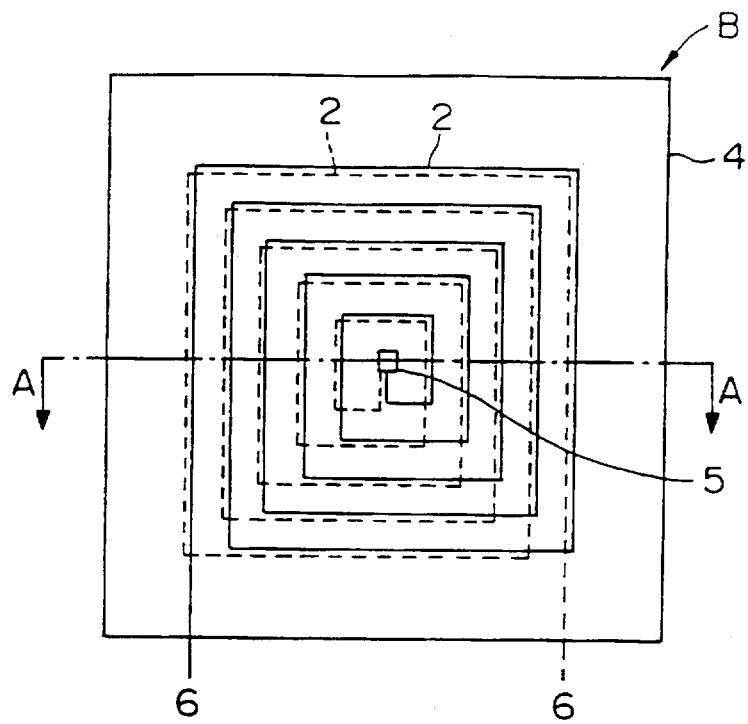
FIG. 29 (a) is a plan view of a first example of a plane-type magnetic device.
Figure 29B:
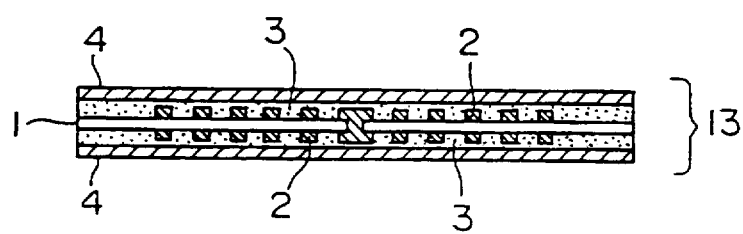

FIGS. 29 (a) and (b) illustrate a first structural example of an inductor (plane-type magnetic device) made using a magnetic film of the soft magnetic alloy having the above-described composition.

The inductor B of this example include planar, spiral coils 2 formed on both sides of a substrate 1, the coils 2 being coated with isolation films 3, the isolation films 3 being further coated with magnetic films 4, and the coils 2, which are formed on both sides of the substrate 1, being electrically connected through a through hole 5 located at the center of the substrate 1. Terminals 6 connected to the coils 2 extended from an edge surface of the inductor B.

The inductor B of this configuration exhibited inductance between terminals 6 by putting the plane coils 2 with the isolation films 3 between the magnetic films 4.

The above-described substrate 1 was made from materials such as a ceramic material, a silicon-wafer substrate, and a resin substrate. When the substrate 1 is made from a ceramic material, the material may be selected from various compounds of alumina, zirconia, silicon carbide, silicon nitride, aluminum nitride, steatite, mullite, cordierire, forsterite, spinel, and others. To make the thermal expansion rate of the substrate close to that of silicon, it is preferable to use a compound, such as aluminum nitride, which has a large thermal conductivity and large bending strength., The plane coils 2 were made from a conductive metal such as copper, silver, gold, aluminum, and alloys thereof. Depending on the desired inductance, DC superposition characteristics and size, the plane coils 2 can be arranged vertically or horizontally with isolation films, and electrically connected in series. The plane coils 2 can be connected in parallel to form a transformer. Moreover, various shapes of the plane coils 2 can be made using photoetching after conductive layers are formed on the substrate. The conductive layers may be formed with an appropriate method, such as press fitting, plating, metal spray, vacuum deposition, sputtering, ion plating, screen printing, and calcination.

The isolation films 3 were provided in order to prevent the plane coils 2 from short-circuiting with the magnetic films 4 when a voltage is applied to the plane coils 2. The isolation films 3 may preferably be an inorganic film, such as a polymer film, including a polyimide film, $SiO_2$, glass, and rigid carbon film. The isolation films 3 may be formed with a method such as calcination after paste printing, hot dipping, flame spraying, vapor phase plating, vacuum deposition, sputtering, and ion plating.

The magnetic films 4 comprise a film of the soft magnetic alloys whose compositions have been described above.

The inductance of the inductor B configured as described above was measured by applying an AC sine current having a frequency of several hundred kHz and an amplitude of several mA. The measured value was several hundreds of μH. Since the inductor B, configured as described above, is small, thin, and lightweight, and also includes the isolation films 4 having a superior magnetic properties, it contributes to making plane-type magnetic devices small and lightweight, and shows large inductance.

Figure 30:
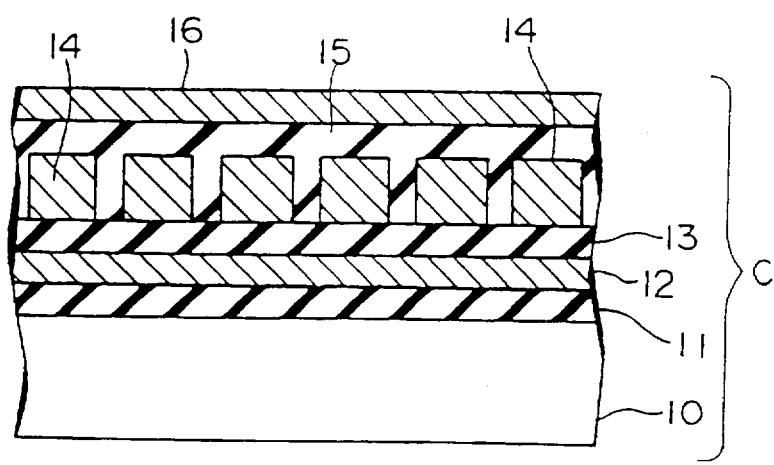
FIG. 30 is a sectional view of a second example of a plane-type magnetic device.

FIG. 30 shows a second structural example of an inductor configured with a magnetic film of the soft magnetic alloys whose compositions have been described above.

In the inductor C of this example, an oxide film 11, a magnetic film 12, and an isolation film 13 were laminated on a substrate 10, in that order, and a plane coil 14 was formed on the isolation film 13. The plane coil 14 and the isolation film 13 were coated with an isolation film 15, then a magnetic film 16 was formed on the isolation film 15.

The substrate 10 was made from a material equivalent to that used for the substrate 1 of the previous example. The magnetic film 12 was made from a material equivalent to that used for the magnetic film 4 of the previous example.

The isolation film 13 was made from a material equivalent to that used for the isolation film 3 of the previous example.

In particular, it is preferred that the magnetic film 12 is configured with a magnetic film of the soft magnetic alloys having the compositions described above.

When a Si wafer substrate is used as the substrate 10, for example, the oxide film 11 can be formed by heating the Si wafer to cause thermally oxidization. The oxide film 11 is dispensable, and can be omitted.

The inductor C configured in this example shows a high inductance, and is small and lightweight, contributing to making plane-type magnetic devices small and lightweight, in the same way as the inductor B of the previous example.

As described above, the soft magnetic alloy thin films of the present invention have higher saturation magnetic flux densities than the Sendust alloy and a soft magnetic amorphous alloy, and show superior properties of low coercive force and high magnetic permeability. In addition, their magnetostriction can easily be made zero with adjustment of their compositions.

Conventional films have higher losses at higher frequencies because the imaginary component of the magnetic permeability of the conventional films becomes higher than the real component at high frequencies. The soft magnetic alloy thin films of the present invention maintains a relatively small imaginary component of magnetic permeability at a frequency range of 30 MHz to 500 MHz, thereby enabling the thin films to be used at high frequencies with low losses.

With use of the above-described soft magnetic alloy thin films, it is possible to provide plane-type magnetic devices which can be used at higher frequencies.

What is claimed is:

1. A soft magnetic alloy thin film comprising:

a fine crystalline phase with an average crystalline grain size of 10 nm or less in diameter and having a body-centered cubic structure mainly composed of Fe;

an amorphous phase having a nitrogen (N) compound as the main composition; and an element M incorporated in at least the amorphous phase, the element M consisting of at least one element selected from the group consisting of Ti, Zr, Hf, V, Nb, Ta, and W;

wherein said amorphous phase comprises at least 50% of the structure of said thin film; and wherein said soft magnetic alloy thin film has a composition consisting essentially of $Fe_aM_bN_c$, where the compositional ratios a, b, and c are atomic percentages, wherein:

$60 \leq a \leq 80$, $7 \leq b \leq 26$, and $10 \leq c \leq 22$, and wherein the amorphous phase includes one or more compounds selected from the group consisting of $M_4N_3$, $Fe_4N$ and MN.

2. A soft magnetic alloy thin film according to claim 1, wherein said compositional ratio c is: $10 \leq c \leq 18$.

3. A soft magnetic allow thin film according to claim 1, wherein said compositional ratio b is: $10 \leq b \leq 15$.

* * * * *